(12) United States Patent
Faler et al.

(10) Patent No.: US 10,941,229 B2
(45) Date of Patent: Mar. 9, 2021

(54) BRIDGED ANILINYL PHENYL PHENOL CATALYST COMPOUNDS

(71) Applicant: ExxonMobil Chemical Patents Inc., Baytown, TX (US)

(72) Inventors: Catherine A. Faler, Houston, TX (US); Margaret T. Whalley, Houston, TX (US); Crisita Carmen H. Atienza, Houston, TX (US); David A. Cano, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/575,766

(22) Filed: Sep. 19, 2019

(65) Prior Publication Data

US 2020/0095352 A1    Mar. 26, 2020

Related U.S. Application Data

(60) Provisional application No. 62/733,984, filed on Sep. 20, 2018.

(51) Int. Cl.
| | | |
|---|---|---|
| *C08F 4/64* | (2006.01) | |
| *C08F 4/76* | (2006.01) | |
| *C08F 210/16* | (2006.01) | |
| *C07F 7/00* | (2006.01) | |
| *C08F 4/60* | (2006.01) | |

(52) U.S. Cl.
CPC ............. *C08F 210/16* (2013.01); *C07F 7/00* (2013.01); *C08F 4/6011* (2013.01); *C08F 4/60141* (2013.01); *C08F 4/6411* (2013.01); *C08F 4/64141* (2013.01)

(58) Field of Classification Search
CPC ..... C08F 4/6411; C08F 4/6211; C08F 4/6011; C08F 4/64141; C08F 4/60141; C08F 4/62141; C08F 210/16
See application file for complete search history.

(56) References Cited

U.S. PATENT DOCUMENTS

| | | | |
|---|---|---|---|
| 7,241,714 B2 | 7/2007 | Boussie et al. | ................ 502/171 |
| 9,233,996 B2 | 1/2016 | Radlauer et al. | ....... C07F 17/00 |
| 9,714,305 B2 * | 7/2017 | Wagner | .................... C08F 10/00 |
| 2016/0024238 A1 | 1/2016 | Wagner et al. | ....... C08F 210/16 |
| 2017/0096511 A1 | 4/2017 | Atienza et al. | ....... C08F 210/16 |

FOREIGN PATENT DOCUMENTS

JP    2015-182992    10/2015    ................ C07F 7/00

OTHER PUBLICATIONS

Kiesewetter, E. T. et al. (2010) "Stereospecific Octahedral Group 4 Bis(phenolate) Ether Complexes for Olefin Polymerization," *J. Am. Chem. Soc.*, v.132(16), pp. 5566-5567.
Kiesewetter, E. T. et al. (2013) "Octahedral Group IV Bis(phenolate) Catalysts for 1-Hexene Homopolymerization and Ethylene/1-Hexene Copolymerization," *Macromolecules*, v.46, pp. 2569-2575.

* cited by examiner

*Primary Examiner* — Rip A Lee

(57) ABSTRACT

The present disclosure provides group 4-, i.e., zirconium- and hafnium-, containing catalyst compounds having an ether bridged anilide phenolate ligand. Catalyst compounds of the present disclosure can be asymmetric, having an electron donating side of the catalyst and an electron deficient side of the catalyst. In at least one embodiment, catalysts of the present disclosure provide catalyst activity values of 400,000 gP/mmolCat·h$^{-1}$ or greater and polyolefins, such as polyethylene copolymers, having comonomer content of from about 3.5 wt % to 8.5 wt %, an Mn of about 15,000 g/mol to about 140,000 g/mol, an Mw of from about 100,000 g/mol to about 300,000 g/mol, and a Mw/Mn of from 1 to 2.5. Catalysts, catalyst systems, and processes of the present disclosure can provide polymers having comonomer content of from 7 wt % to 12 wt %, such as from 8 wt % to 10 wt %).

34 Claims, No Drawings

BRIDGED ANILINYL PHENYL PHENOL CATALYST COMPOUNDS

CROSS-REFERENCE TO RELATED APPLICATIONS

This application claims priority to and benefit of Provisional Application No. 62/733,984 filed Sep. 20, 2018, the disclosure of which is incorporated herein by reference.

FIELD

The present disclosure provides catalyst compounds including an ether bridged aniline phenolate, production, and use thereof.

BACKGROUND

Olefin polymerization catalysts are of great use in industry and polyolefins are widely used commercially because of their robust physical properties. Hence, there is interest in finding new catalyst systems that increase the utility/efficiency of the catalyst and facilitate the production of polymers having improved properties.

Low density polyethylene is generally prepared at high pressure using free radical initiators, or in gas phase processes using Ziegler-Natta or vanadium catalysts. Suitable low density polyethylene has a density in the range of 0.916 g/cm$^3$ to 0.940 g/cm$^3$. Suitable low density polyethylene produced using free radical initiators is known in the industry as "LDPE". LDPE is also known as "branched" or "heterogeneously branched" polyethylene because of the relatively large number of long chain branches extending from the main polymer backbone. Polyethylene in the same density range, e.g., 0.916 g/cm$^3$ to 0.940 g/cm$^3$, which is linear and does not contain long chain branching, is known as "linear low density polyethylene" ("LLDPE") and can be produced by conventional Ziegler-Natta catalysts or with metallocene catalysts. "Linear" means that the polyethylene has few, if any, long chain branches, referred to as a g'$_{vis}$ value of 0.97 or above, such as 0.98 or above. Polyethylenes having still greater density are the high density polyethylenes ("HDPEs"), e.g., polyethylenes having densities greater than 0.940 g/cm$^3$, and are generally prepared with Ziegler-Natta catalysts or chrome catalysts. Very low density polyethylenes ("VLDPEs") can be produced by a number of different processes yielding polyethylenes having a density less than 0.916 g/cm$^3$, such as 0.890 g/cm$^3$ to 0.915 g/cm$^3$ or 0.900 g/cm$^3$ to 0.915 g/cm$^3$.

Polyolefins, such as polyethylene, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight fraction of the composition with the improved processing properties of a low molecular weight fraction of the composition.

Useful polyolefins, such as polyethylene, may have a comonomer, such as hexene, incorporated into the polyethylene backbone. These copolymers provide varying physical properties compared to polyethylene alone and can be produced in a low pressure reactor, utilizing, for example, solution, slurry, or gas phase polymerization processes. Polymerization may take place in the presence of catalyst systems such as those employing a Ziegler-Natta catalyst, a chromium based catalyst, or a metallocene. The comonomer content of a polyolefin (e.g., wt % of comonomer incorporated into a polyolefin backbone) influences the properties of the polyolefin (and composition of the copolymers) and is influenced by the polymerization catalyst.

A copolymer composition, such as a resin, has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1,000 carbons is similar among the copolymer molecules of different chain lengths, the composition distribution is said to be "narrow".

Like comonomer content, the composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

Polyolefin compositions may have broad composition distributions that include a first polyolefin component having low molecular weight and low comonomer content while a second polyolefin component has a high molecular weight and high comonomer content. Compositions having this broad orthogonal composition distribution in which the comonomer is incorporated predominantly in the high molecular weight chains can provide improved physical properties, for example toughness properties and environmental stress crack resistance (ESCR).

Also, like comonomer content, a composition distribution of a copolymer composition is influenced by the identity of the catalyst used to form the polyolefins of the composition. Ziegler-Natta catalysts and chromium based catalysts generally produce compositions with broad composition distributions, whereas metallocene catalysts typically produce compositions with narrow composition distributions.

Nonetheless, polyolefin compositions formed by catalysts capable of forming high molecular weight polyolefins also often have a broad molecular weight distributions, as indicated by high polydispersity indices, and often have processing difficulties due to hardness. Furthermore, catalysts capable of forming high molecular weight polyolefins can have low activity (e.g., amount of desirable polymer produced per a period of time).

There is a need for catalysts having high activity and capable of forming polyolefins, for example, with high molecular weight and high comonomer content.

References of interest include: U.S. Pat. No. 7,241,714 B2, 2007; Kiesewetter, E. T. et al., *J. Am. Chem. Soc.* 2010, v.132(16), pp. 5566-5567; Kiesewetter, E. T. et al. (2013) *Macromolecules*, v.46(7), pp. 2569-2575.

SUMMARY

This invention relates to catalyst compounds represented by Formula (I):

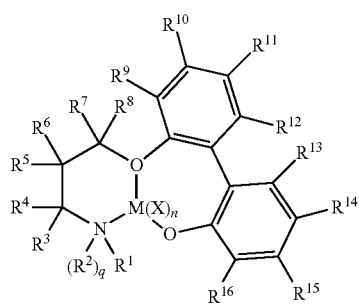

wherein:

M is a group 4 metal;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, or $R^{16}$ are joined together to form a $C_4$-$C_{62}$ cyclic or polycyclic ring structure, or a combination thereof;

each X is independently $C_1$-$C_{20}$ hydrocarbyl, $C_1$-$C_{20}$ substituted hydrocarbyl, a heteroatom or a heteroatom-containing group, or two or more Xs join together to form a $C_4$-$C_{62}$ cyclic or polycyclic ring structure;

q is 0 or 1; and n is 2 or 3, and when q is 0, then n is 2, and when q is 1, then n is 3.

In yet another embodiment, the present disclosure provides a catalyst system including an activator and a catalyst of the present disclosure.

In yet another embodiment, the present disclosure provides a catalyst system including an activator, a catalyst support, and a catalyst of the present disclosure.

In still another embodiment, the present disclosure provides a polymerization process including a) contacting one or more olefin monomers with a catalyst system including: i) an activator and ii) a catalyst of the present disclosure.

In still another embodiment, the present disclosure provides a polyolefin formed by a catalyst system and or method of the present disclosure.

DETAILED DESCRIPTION

The present disclosure provides catalyst compounds including an ether bridged aniline phenolate, catalyst systems including such, and uses thereof. In at least one embodiment, the present disclosure is directed to catalyst compounds, catalyst systems, and their use in polymerization processes to produce polyolefin polymers, such as polyethylene polymers and polypropylene polymers. Catalyst compounds of the present disclosure can be zirconium or hafnium-containing compounds having one or more benzyl ligand(s) substituted and linked with an ether bridged aniline phenolate. In another class of embodiments, the present disclosure is directed to polymerization processes to produce polyolefin polymers from catalyst systems including one or more olefin polymerization catalysts, at least one activator, and an optional support.

For example, the present disclosure is directed to a polymerization process to produce an ethylene polymer, the process including contacting a catalyst system including one or more catalyst compounds, at least one activator, and at least one support, with ethylene and one or more $C_3$-$C_{10}$ alpha-olefin comonomers under polymerization conditions.

Catalysts, catalyst systems, and processes of the present disclosure can provide one or more of: polyolefins at high activity values (e.g., 50,000 gP/mmolCat·h$^{-1}$ or greater), an Mn of about 15,000 g/mol to about 140,000 g/mol, an Mw of from about 100,000 g/mol to about 300,000 g/mol, and a narrow Mz/Mw of from 1 to 2.5. Catalysts, catalyst systems, and processes of the present disclosure can provide polymers having comonomer content of from 3.5 wt % to 12 wt %, such as 4 wt % to 12 wt %, such as from 7 wt % to 10 wt %.

For the purposes of the present disclosure, the numbering scheme for the Periodic Table Groups is used as described in *Chemical and Engineering News*, v.63(5), pg. 27 (1985). Therefore, a "group 4 metal" is an element from group 4 of the Periodic Table, e.g., Hf, Ti, or Zr.

The specification describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which, without being bound by theory, is believed to create a cation as a result of the removal of an anionic group, often referred to as a leaving group, from the transition metal.

As used herein, "olefin polymerization catalyst(s)" refers to any catalyst, such as an organometallic complex or compound that is capable of coordination polymerization addition where successive monomers are added in a monomer chain at the organometallic active center.

The terms "substituent," "radical," "group," and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

"Catalyst productivity" is a measure of how many grams of polymer (P) are produced using a polymerization catalyst including W g of catalyst (cat), over a period of time of T hours; and may be expressed by the following formula: P/(T×W) and expressed in units of gP·gcat$^{-1}$hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used per hour (kgP·molcat$^{-1}$·h$^{-1}$).

"BOCD" refers to a Broad Orthogonal Composition Distribution in which the comonomer of a copolymer is incorporated predominantly in the high molecular weight chains or species of a polyolefin polymer or composition. The distribution of the short chain branches (as an indicator of comonomer content) can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights of polymer chains. BOCD has been described, for example, in U.S. Pat. No. 8,378,043, Col. 3, line 34, bridging Col. 4, line 19, and U.S. Pat. No. 8,476,392, line 43, bridging Col. 16, line 54.

An "olefin," alternatively referred to as "alkene," is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" is used to refer to mer units indicates that the mer units differ from each other by at least one atom or are different isomerically. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on.

Unless otherwise indicated, as used herein, "low comonomer content" is defined as a polyolefin having less than 8 wt % of comonomer based upon the total weight of the polyolefin. As used herein, "high comonomer content" is defined as a polyolefin having greater than or equal to 8 wt % of comonomer based upon the total weight of the polyolefin.

For the purposes of the present disclosure, ethylene shall be considered an α-olefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol. Unless otherwise indicated, as used herein, "high molecular weight" is defined as a number average molecular weight (Mn) value of 100,000 g/mol or more. "Low molecular weight" is defined as an Mn value of less than 100,000 g/mol.

Unless otherwise noted all melting points (Tm) are differential scanning calorimetry (DSC) second melt.

Unless otherwise noted all DSC melt enthalpy ($\Delta H_f$) are in J/g.

The following abbreviations may be used herein: dme is 1,2-dimethoxyethane, Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, nBu is normal butyl, sBu is sec-butyl, DMAH-PFPB is N,N-dimethylanilinium tetrakis(pentafluorophenyl)borate, TMS is trimethylsilyl, TIBAL is triisobutylaluminum, TNOAL is tri(n-octyl)aluminum, MAO is methylalumoxane, Ph is phenyl, Bn is benzyl (i.e., CH$_2$Ph), Cbz is Carbazole, THF (also referred to as thf) is tetrahydrofuran, RT is room temperature (23° C., unless otherwise indicated), tol is toluene, EtOAc is ethyl acetate, and Cy is cyclohexyl.

A "catalyst system" includes at least one catalyst compound and at least one activator. When "catalyst system" is used to describe such the catalyst compound/activator combination before activation, it means the unactivated catalyst complex (precatalyst) together with an activator and, optionally, a co-activator. When it is used to describe the combination after activation, it means the activated complex and the activator or other charge-balancing moiety. The transition metal compound may be neutral as in a precatalyst, or a charged species with a counter ion as in an activated catalyst system. For the purposes of the present disclosure, when catalyst systems are described as including neutral stable forms of the components, it is well understood by one of ordinary skill in the art, that the ionic form of the component is the form that reacts with the monomers to produce polymers.

In the description herein, the catalyst may be described as a catalyst precursor, a pre-catalyst compound, catalyst compound or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion. Activator and cocatalyst are also used interchangeably.

A scavenger is a compound that may be added to facilitate polymerization by scavenging impurities. Some scavengers may also act as activators and may be referred to as co-activators. A co-activator, that is not a scavenger, may also be used in conjunction with an activator in order to form an active catalyst. In at least one embodiment, a co-activator can be pre-mixed with the transition metal compound to form an alkylated transition metal compound.

Non-coordinating anion (NCA) is an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate (DMAH-PFPB), that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In at least one embodiment, the alkyl group may include at least one aromatic group.

Except with respect to the term "substituted hydrocarbyl," the term "substituted" means that at least one hydrogen atom has been replaced with at least one non-hydrogen group, such as a hydrocarbyl group, a heteroatom, or a heteroatom containing group, such as halogen (such as Br, Cl, F, or I) or a functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, where each R* is independently a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring. As an example, ethyl alcohol is an ethyl group substituted with an —OH group.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH2)q-SiR*$_3$, and the like, where q is 1 to 10 and each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "hydrocarbyl substituted phenyl" means a phenyl group having 1, 2, 3, 4 or 5 hydrogen groups replaced by a hydrocarbyl or substituted hydrocarbyl group. Preferably the "hydrocarbyl substituted phenyl" group is represented by the formula:

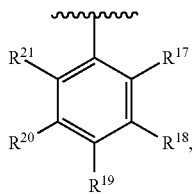

where each of $R^{17}$, $R^{18}$, $R^{19}$, $R^{20}$, and $R^{21}$ is independently selected from hydrogen, $C_1$-$C_{40}$ hydrocarbyl or $C_1$-$C_{40}$ substituted hydrocarbyl, a heteroatom or a heteroatom-containing group (provided that at least one of $R^{17}$, $R^{18}$, $R^{19}$, $R^{20}$, and $R^{21}$ is not H), or two or more of $R^{17}$, $R^{18}$, $R^{19}$, $R^{20}$, and $R^{21}$ are joined together to form a $C_4$-$C_{62}$ cyclic or polycyclic ring structure, or a combination thereof.

The term "substituted phenyl," mean a phenyl group having 1 or more hydrogen groups replaced by a hydrocarbyl, substituted hydrocarbyl, heteroatom or heteroatom containing group.

The term "substituted carbazole," means a carbazole group having 1 or more hydrogen groups replaced by a hydrocarbyl, substituted hydrocarbyl, heteroatom or heteroatom containing group.

The term "substituted naphthyl," means a naphthyl group having 1 or more hydrogen groups replaced by a hydrocarbyl, substituted hydrocarbyl, heteroatom or heteroatom containing group.

The term "substituted anthracenyl," means an anthracenyl group having 1 or more hydrogen groups replaced by a hydrocarbyl, substituted hydrocarbyl, heteroatom or heteroatom containing group.

The term "substituted fluorenyl" means a fluorenyl group having 1 or more hydrogen groups replaced by a hydrocarbyl, substituted hydrocarbyl, heteroatom or heteroatom containing group.

The terms "hydrocarbyl radical," "hydrocarbyl," "hydrocarbyl group," "alkyl radical," and "alkyl" are used interchangeably. Likewise, the terms "group," "radical," and "substituent" are also used interchangeably. For purposes of this disclosure, "hydrocarbyl radical" is defined to be $C_1$-$C_{100}$ radicals, that may be linear, branched, or cyclic, and when cyclic, aromatic or non-aromatic. Examples of such radicals can include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and the like.

Certain abbreviations may be used to for the sake of brevity and include but are not limited to me=methyl, Et=ethyl, Pr=propyl, Bu=butyl, Ph=phenyl, Cp=cyclopentadienyl, Cp*=pentamethyl cydopentadienyl, Ind=indenyl, etc.

The term "alkenyl" means a straight-chain, branched-chain, or cyclic hydrocarbon radical having one or more double bonds. These alkenyl radicals may be optionally substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl, and the like, including their substituted analogues.

The term "alkoxy" or "alkoxide" means an alkyl ether or aryl ether radical where the term alkyl is as defined above. Examples of suitable alkyl ether radicals can include methoxy, ethoxy, n-propoxy, iso-propoxy, n-butoxy, iso-butoxy, sec-butoxy, tert-butoxy, phenoxyl, and the like.

The term "aryl" or "aryl group" means a six carbon aromatic ring and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom-substituted ring.

The term "continuous" means a system that operates without interruption or cessation. For example, a continuous process to produce a polymer would be one where the reactants are continually introduced into one or more reactors and polymer product is continually withdrawn until the polymerization is stopped, e.g. at 300 minutes.

A solution polymerization means a polymerization process in which the polymer is dissolved in a liquid polymerization medium, such as an inert solvent or monomer(s) or their blends. A solution polymerization is homogeneous. A homogeneous polymerization is one where the polymer product is dissolved in the polymerization medium. Suitable systems may be not turbid as described in Oliveira, J. V. et al. (2000) Ind. Eng. Chem. Res., vol. 39(12), p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

Transition Metal Complexes

In at least one embodiment, the present disclosure relates to novel bridged transition metal complexes, where the complexes include at least one a $C_4$-$C_{62}$ cyclic or polycyclic ring structure with particular combinations of substituents and bridged with, for example, a tridentate ethylene bridged amine bis(phenolate) group. In at least one embodiment, the bridge is characterized in that it has at least one functionality, either included in the bridge or bonded to it.

This invention relates to catalyst compounds, and catalyst systems including such compounds, represented by formula (I):

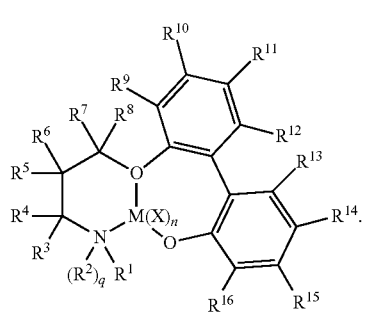

(I)

M is a group 4 metal, preferably zirconium, titanium, and hafnium, more preferably, M is zirconium or hafnium; and each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently hydrogen, $C_1$-$C_{40}$ hydrocarbyl or $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, or $R^{16}$ are joined together to form a $C_4$-$C_{62}$ cyclic or polycyclic ring structure, or a combination thereof.

In embodiments of the invention, each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently selected from methyl, ethyl, propyl, butyl, pentyl, hexyl, octyl, nonyl, decyl, undecyl, dodecyl, phenyl, substituted phenyl (such as hydrocarbyl substituted phenyl), biphenyl or an isomer thereof, which may be halogenated (such as perfluoropropyl, perfluorobutyl, perfluoroethyl, perfluoromethyl), substituted hydrocarbyl radicals and all isomers of thereof (including trimethylsilylpropyl, trimethylsilylmethyl, and trimethylsilylethyl).

Preferably, in any embodiment of the invention described herein the hydrocarbyl substituted phenyl is represented by the formula:

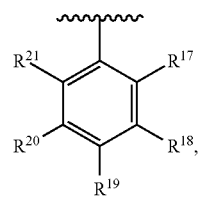

where each of $R^{17}$, $R^{18}$, $R^{19}$, $R^{20}$, and $R^{21}$ is independently selected from hydrogen, $C_1$-$C_{40}$ hydrocarbyl or $C_1$-$C_{40}$ substituted hydrocarbyl, a heteroatom or a heteroatom-containing group, or two or more of $R^{17}$, $R^{18}$, $R^{19}$, $R^{20}$, and $R^{21}$ are joined together to form a $C_4$-$C_{62}$ cyclic or polycyclic ring structure, or a combination thereof. Preferably, each of $R^{17}$, $R^{18}$, $R^{19}$, $R^{20}$, and $R^{21}$ is independently selected from methyl, ethyl, propyl, butyl, pentyl, hexyl, heptyl, octyl, nonyl, decyl, undecyl, dodecyl, phenyl, substituted phenyl (such as hydrocarbyl substituted phenyl), biphenyl or an isomer thereof, a heteroatom or a heteroatom-containing group. Preferably, the phenyl group is substituted at the meta or para positions, such as the 3' and/or 5' positions (e.g., $R^{18}$ and $R^{20}$), such as with $C_4$ to $C_{12}$ alkyl groups. Alternately the phenyl group may be substituted at the 2' position (e.g., $R^{17}$), but is not substituted in the 2' and 6' positions (e.g., $R^{17}$ and $R^{21}$). Preferably, when the 2' position of the phenyl is substituted, the 6' position is H). In a preferred embodiment, $R^{18}$ and $R^{20}$ are t-butyl.

The term "hydrocarbyl substituted phenyl" includes all isomers thereof, such as methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like.

In embodiments of the invention, $R^2$ is hydrogen or $C_1$-$C_{40}$ hydrocarbyl such as methyl, ethyl, propyl, butyl, pentyl, hexyl, heptyl, octyl, nonyl, decyl, undecyl, dodecyl, phenyl, substituted phenyl (such as hydrocarbyl substituted phenyl), biphenyl or an isomer thereof, including perfluoropropyl, perfluorobutyl, perfluoroethyl, perfluoromethyl, substituted hydrocarbyl radicals and all isomers of substituted hydrocarbyl radicals including trimethylsilylpropyl, trimethylsilylmethyl, or trimethylsilylethyl. In preferred embodiments of the invention, $R^2$ is selected from hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, isomers thereof and mixtures thereof. In at least one embodiment, $R^2$ is a $C_1$-$C_{10}$ hydrocarbyl, such as methyl, ethyl, propyl, butyl, pentyl, hexyl, heptyl, octyl, nonyl, or decyl.

In at least one embodiment, $R^1$ is represented by the formula:

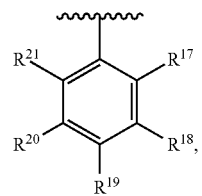

where each of $R^{17}$, $R^{18}$, $R^{19}$, $R^{20}$, and $R^{21}$ is independently selected from hydrogen, $C_1$-$C_{40}$ hydrocarbyl or $C_1$-$C_{40}$ substituted hydrocarbyl, a heteroatom or a heteroatom-containing group, or two or more of $R^{17}$, $R^{18}$, $R^{19}$, $R^{20}$, and $R^{21}$ are joined together to form a $C_4$-$C_{62}$ cyclic or polycyclic ring structure, or a combination thereof. In at least one embodiment, each of $R^{17}$, $R^{18}$, $R^{19}$, $R^{20}$, and $R^{21}$ is independently selected from methyl, ethyl, propyl, butyl, pentyl, hexyl, heptyl, octyl, nonyl, decyl, undecyl, dodecyl, phenyl, substituted phenyl, biphenyl or an isomer thereof, a heteroatom or a heteroatom-containing group, or two or more of $R^{17}$, $R^{18}$, $R^{19}$, $R^{20}$, and $R^{21}$ are joined together to form a $C_4$-$C_{62}$ cyclic or polycyclic ring structure, or a combination thereof. Preferably, the phenyl group is substituted at the meta or para positions, such as the 3' and/or 5' positions (e.g., $R^{18}$ and $R^{20}$), such as with $C_4$ to $C_{12}$ alkyl groups. Alternately the phenyl group may be substituted at the 2' position (e.g., $R^{17}$), but is not substituted in the 2' and 6' positions (e.g., $R^{17}$ and $R^{21}$). Preferably, when the 2' position of the phenyl is substituted, the 6' position is H). In a preferred embodiment, $R^{18}$ and $R^{20}$ are t-butyl.

In at least one embodiment, each of $R^{17}$, $R^{18}$, $R^{19}$, $R^{20}$, and $R^{21}$ is independently selected from hydrogen and $C_1$-$C_{40}$ hydrocarbyl, such as each of $R^{17}$ and $R^{21}$ is $C_1$-$C_{10}$ hydrocarbyl, such as each of $R^{17}$ and $R^{21}$ is methyl, ethyl, propyl, butyl, pentyl, hexyl, heptyl, octyl, nonyl, decyl, phenyl, substituted phenyl, biphenyl or an isomer thereof.

In at least one embodiment, each of $R^{18}$, $R^{19}$, and $R^{20}$ can be hydrogen.

In at least one embodiment, $R^{16}$ is selected from unsubstituted phenyl, substituted phenyl, unsubstituted carbazole, substituted carbazole, unsubstituted naphthyl, substituted naphthyl, unsubstituted anthracenyl, substituted anthracenyl, unsubstituted fluorenyl, or substituted fluorenyl, such as $R^{16}$ is unsubstituted phenyl, such as $R^{16}$ is unsubstituted carbazole.

In at least one embodiment, each of $R^3$, $R^4$, $R^5$, $R^6$, $R^7$, and $R^8$ is independently hydrogen or a $C_1$-$C_{10}$ hydrocarbyl. Alternately, three or more of $R^3$, $R^4$, $R^5$, $R^6$, $R^7$, and $R^8$ are hydrogen, such as each of $R^3$, $R^4$, $R^5$, $R^6$, $R^7$, and $R^8$ is hydrogen.

In at least one embodiment, each X is independently $C_1$-$C_{20}$ hydrocarbyl or $C_1$-$C_{20}$ substituted hydrocarbyl such as methyl, ethyl, propyl, butyl, pentyl, hexyl, heptyl, octyl, nonyl, decyl, undecyl, dodecyl, phenyl, substituted phenyl, biphenyl or an isomer thereof, a heteroatom or a heteroatom-containing group, or two or more Xs join together to form a $C_4$-$C_{62}$ cyclic or polycyclic ring structure, such. In other embodiments of the present disclosure, each X is, independently, selected from hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system).

Suitable examples for X include chloride, bromide, fluoride, iodide, hydride, and $C_1$ to $C_{20}$ hydrocarbyls, such as methyl, ethyl, propyl, butyl, pentyl, hexyl, phenyl, benzyl, and isomers thereof, or two X together are selected from $C_4$ to $C_{10}$ dienes, such as butadiene, methylbutadiene, pentadiene, methylpentadiene, dimethylpentadiene, hexadiene, methylhexadiene, dimethylhexadiene, or from $C_1$ to $C_{10}$ alkylidenes, such as methylidene, ethylidene, propylidene, or from $C_3$ to $C_{10}$ alkyldiyls, such as propandiyl, butandiyl, pentandiyl, and hexandiyl. In particular, X is methyl, benzyl, or chloro.

In at least one embodiment, q is 0 or 1, such as q is 1.

In at least one embodiment, n is 2 or 3, where if q is 0, then n is 2, or if q is 1, then n is 3.

Preferably, the catalyst compound is one or more of:

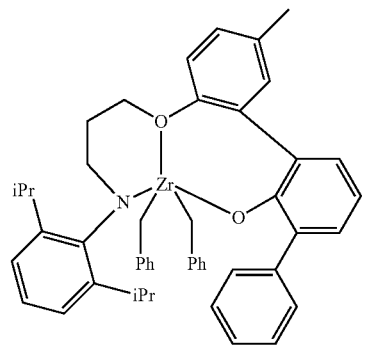

1

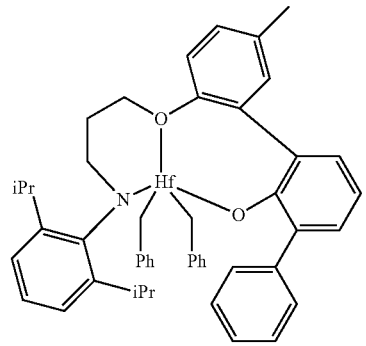

2

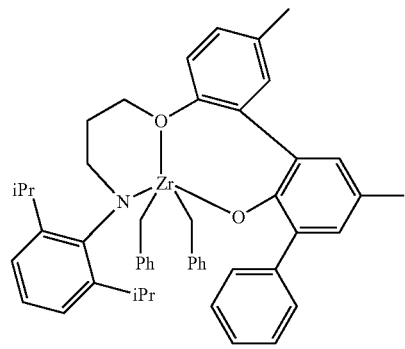

3

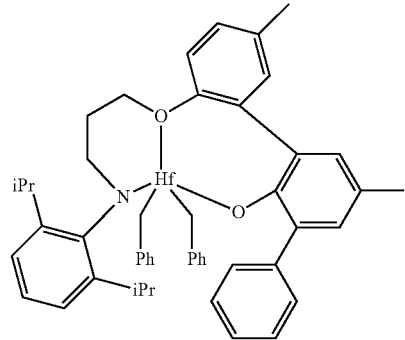

4

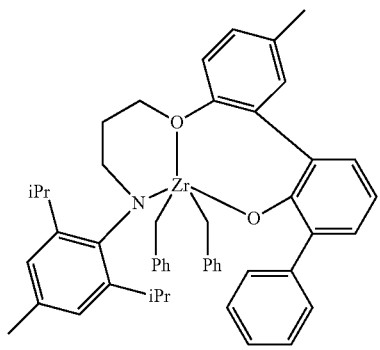
5
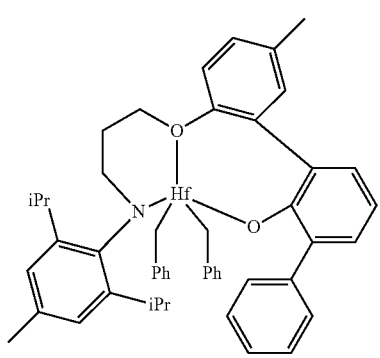
6
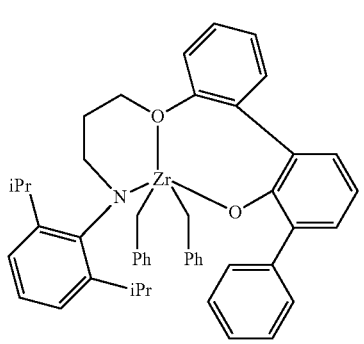
7
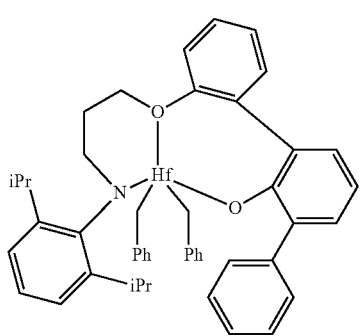
8
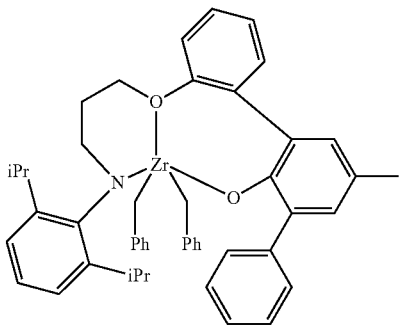
9
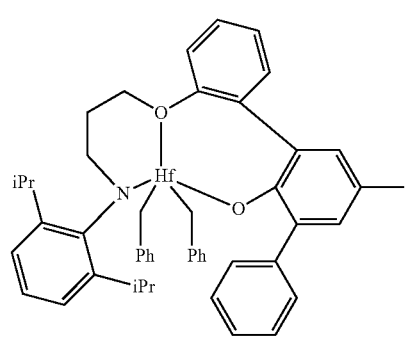
10
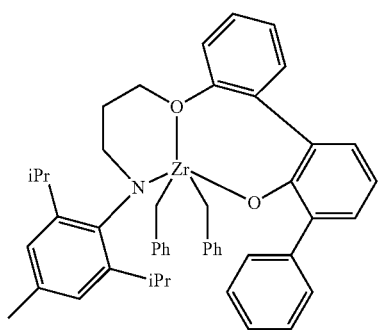
11
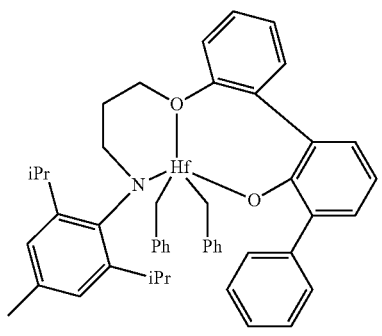
12

13
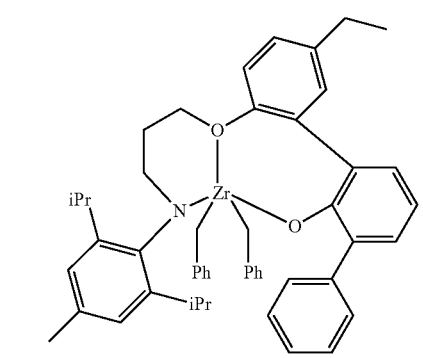
14
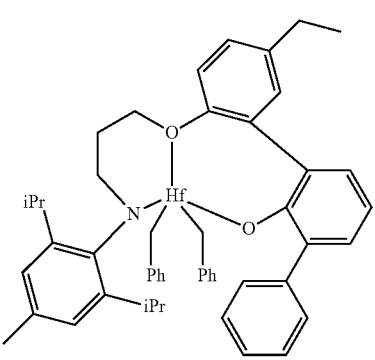
15
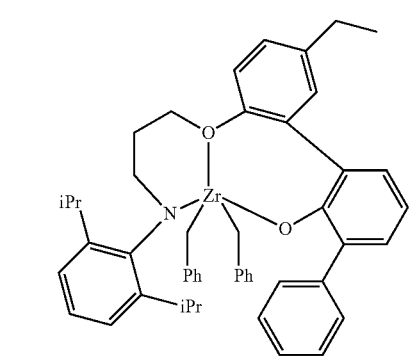
16
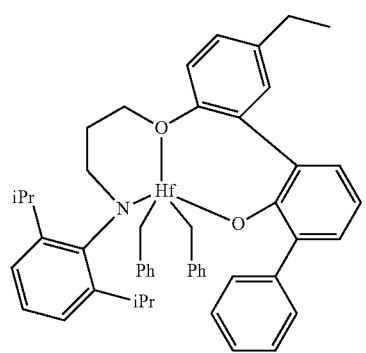
17
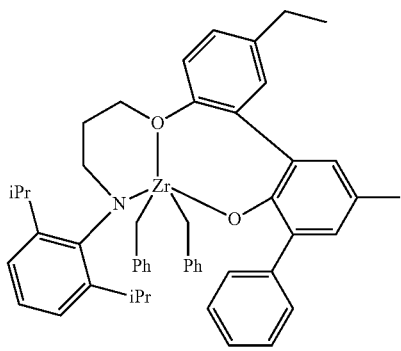
18
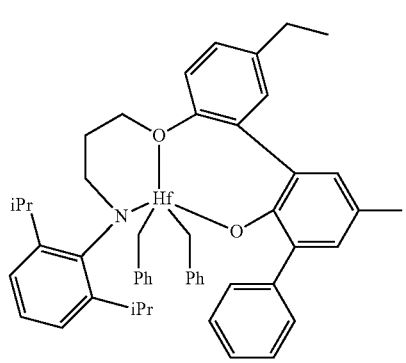
19
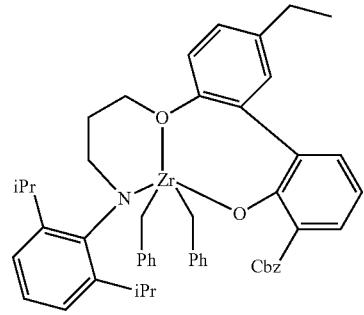
20
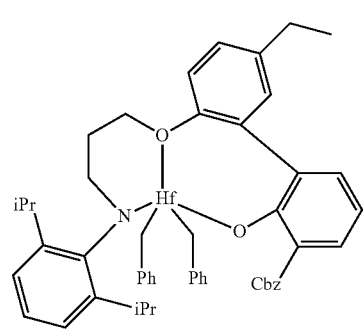

21
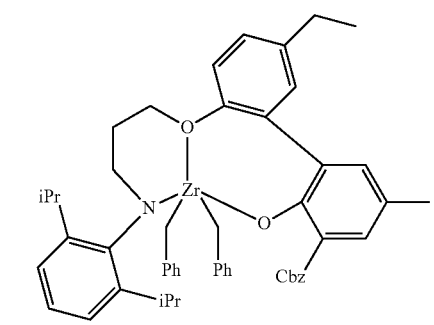
22
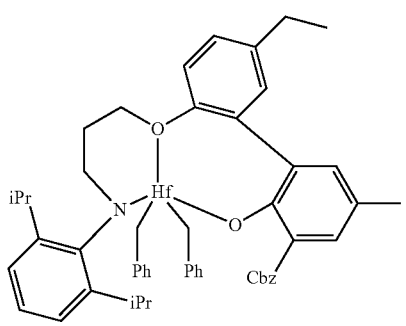
23
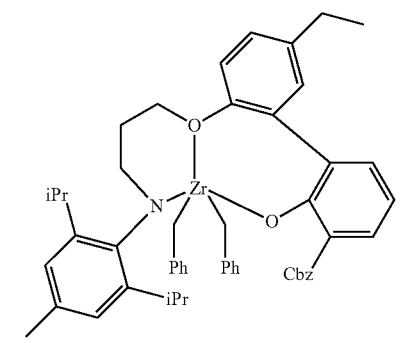
24
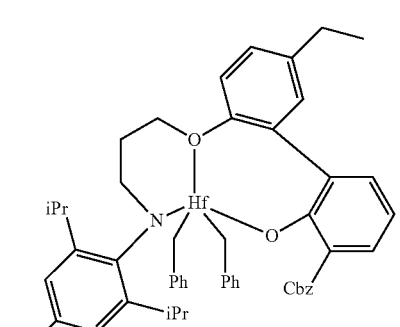
25
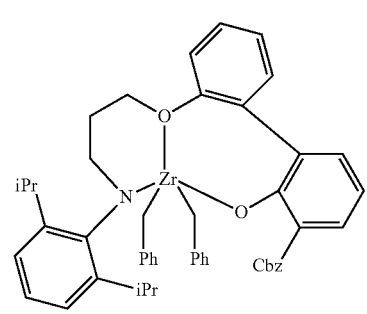
26
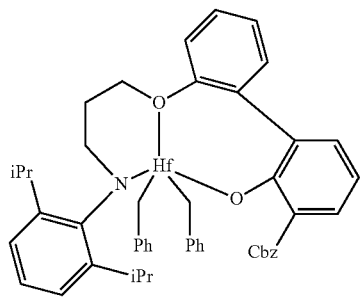
27
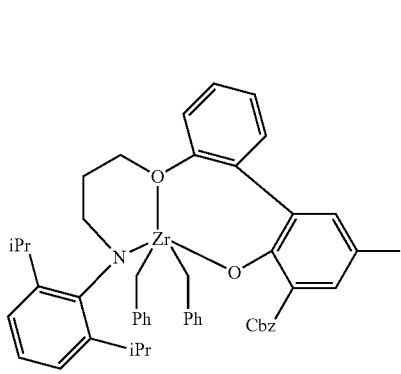
28
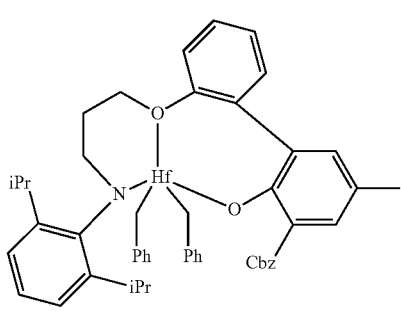
29
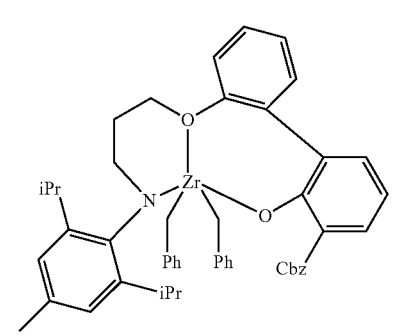
30
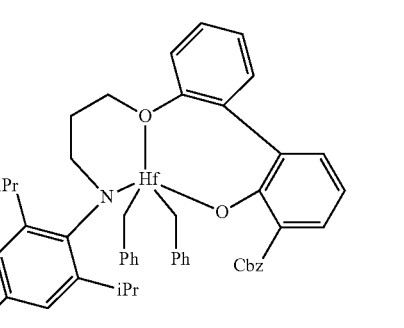

-continued
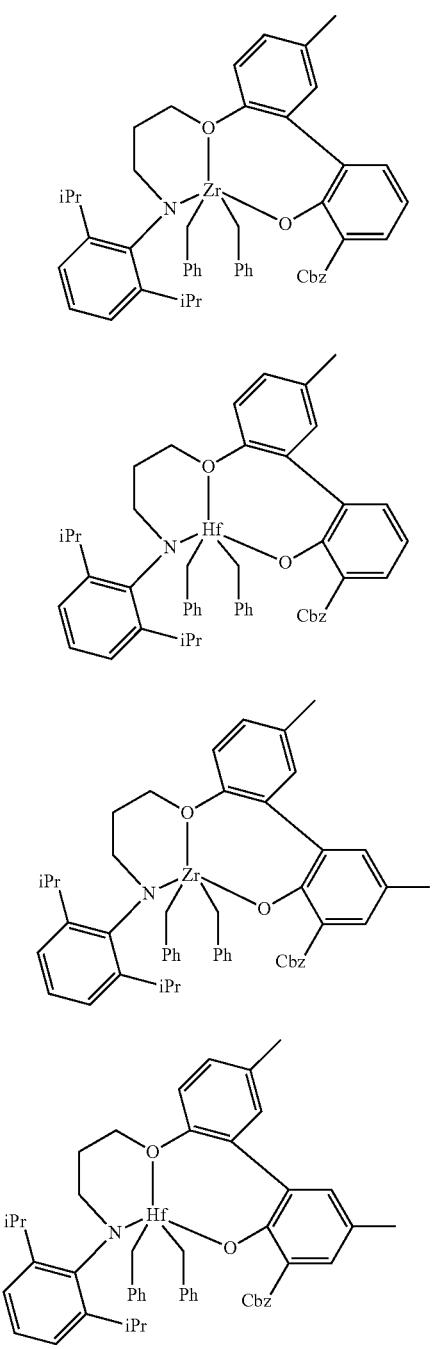
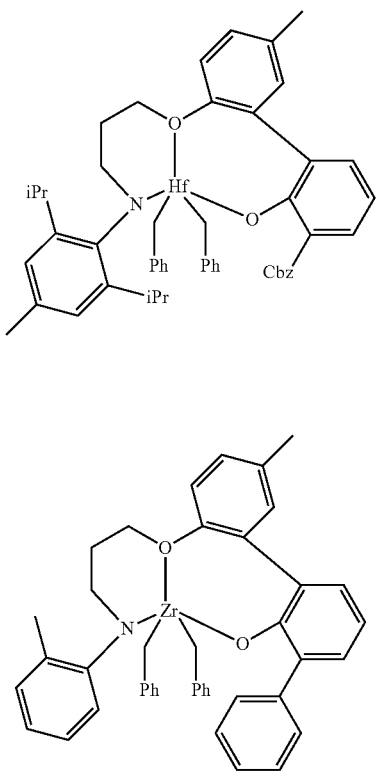
In at least one embodiment, the catalyst compound represented by formula (I) is selected from:
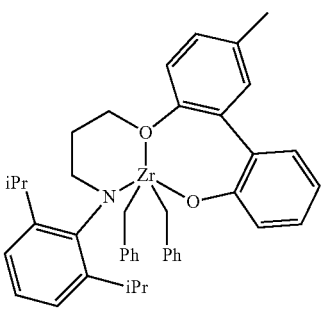

2
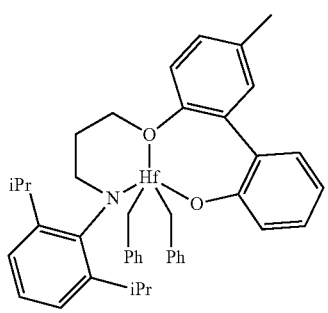
In at least one embodiment, the catalyst compound represented by formula (I) is selected from:
39
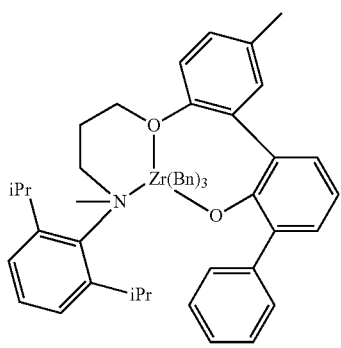
40
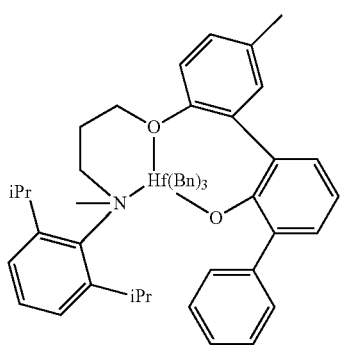
41
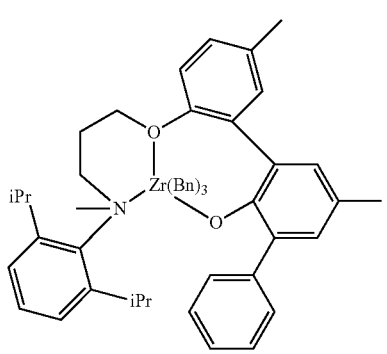
42
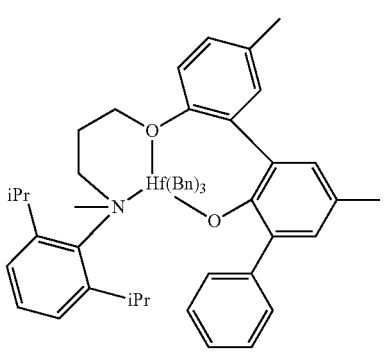
43
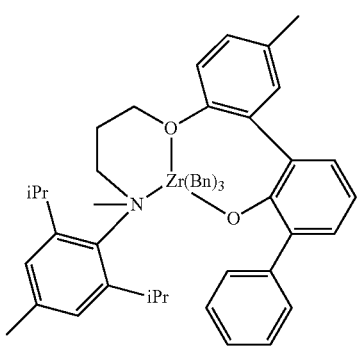
44
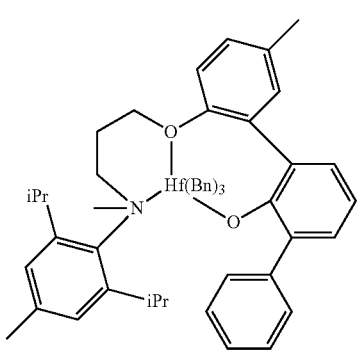
45
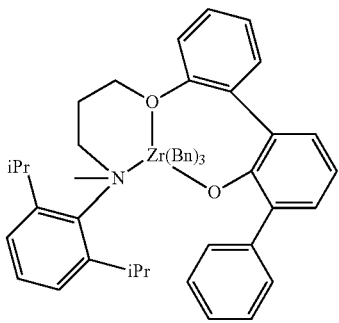

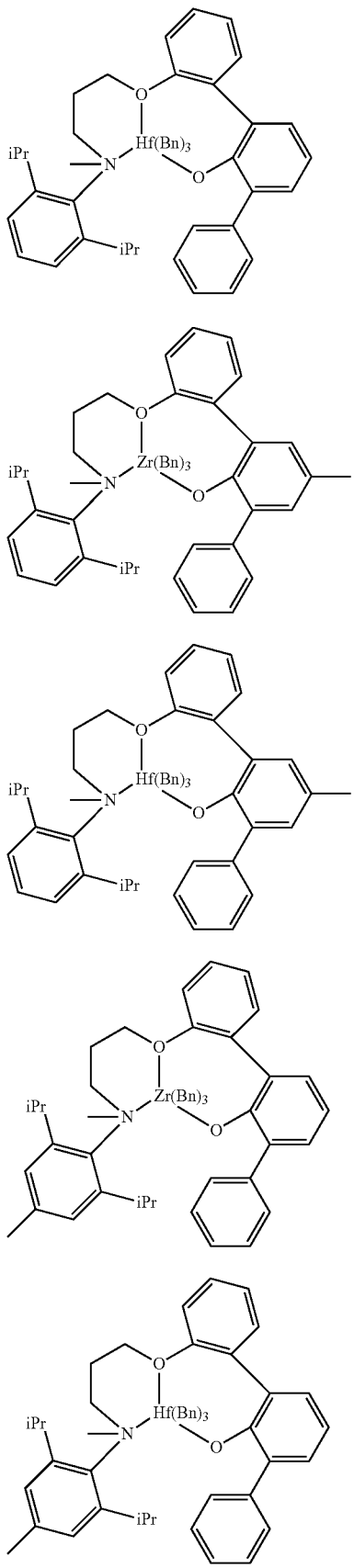
46
47
48
49
50
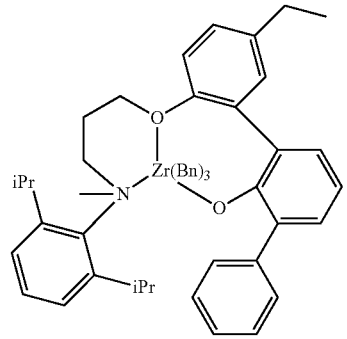
51
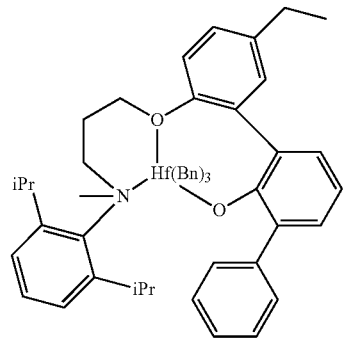
52
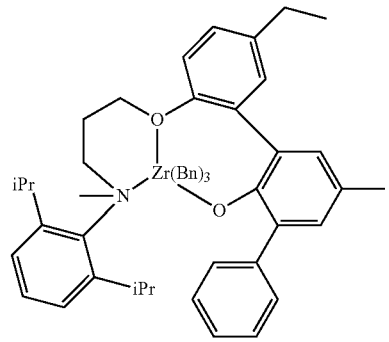
53
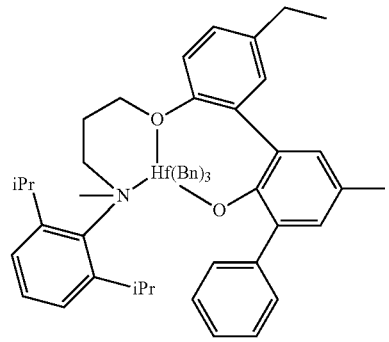
54

55
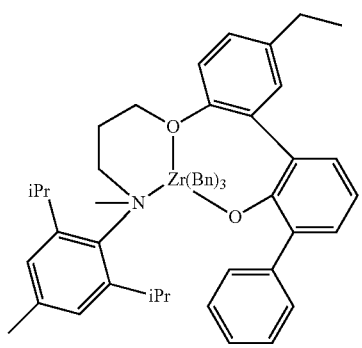
56
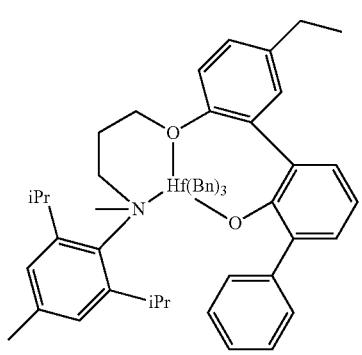
57
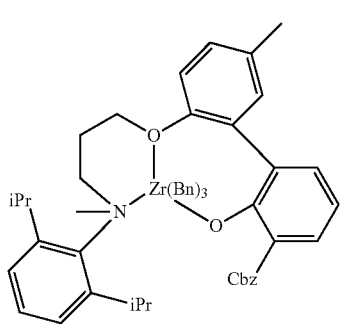
58
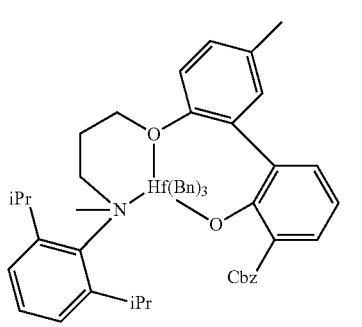
59
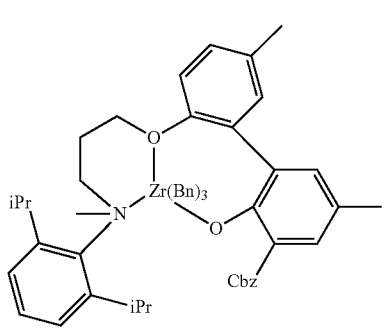
60
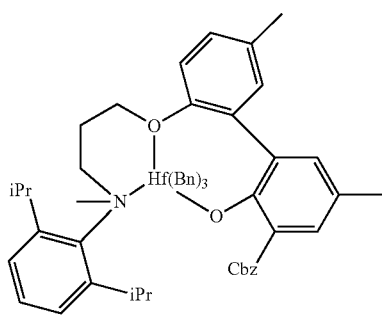
61
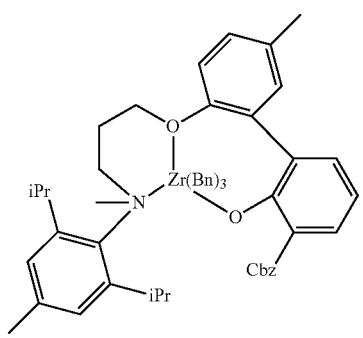
62
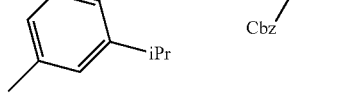
63
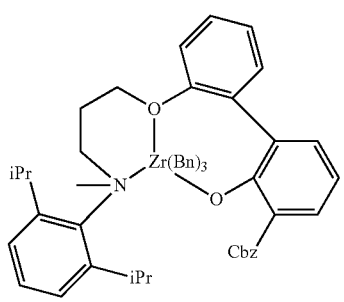
64
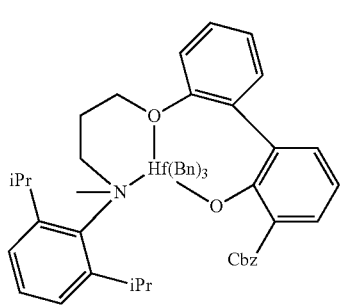

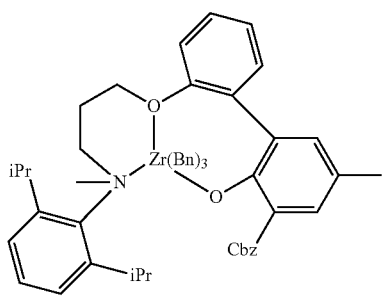
65
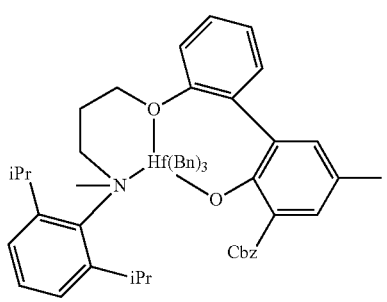
66
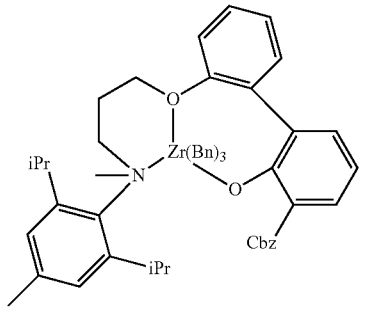
67
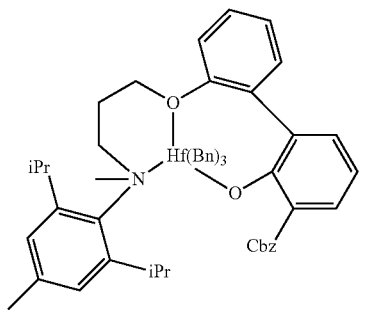
68
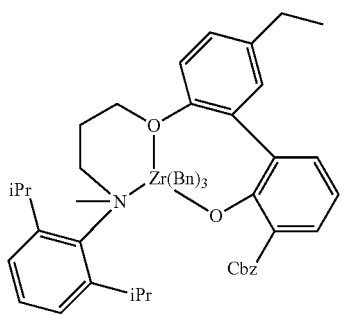
69
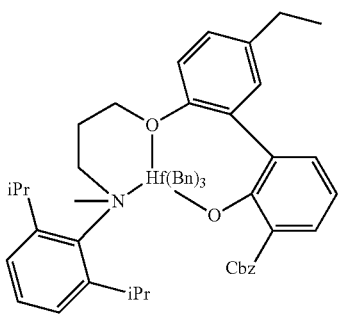
70
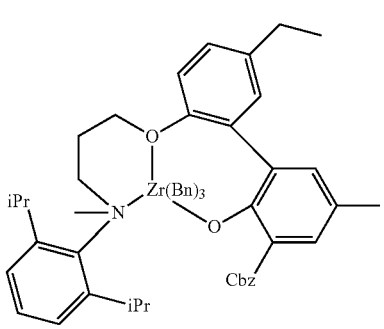
71
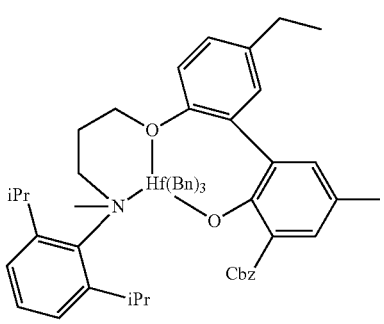
72
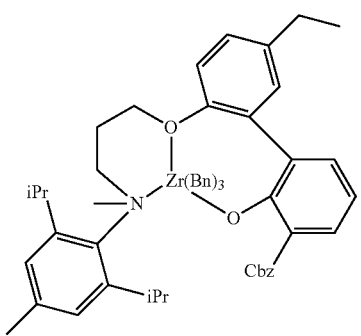
73

-continued

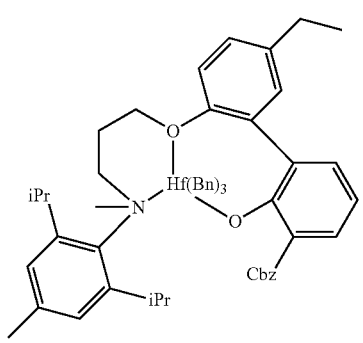
74

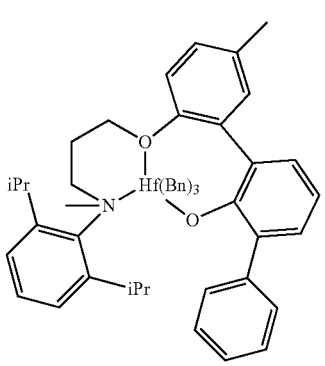
40

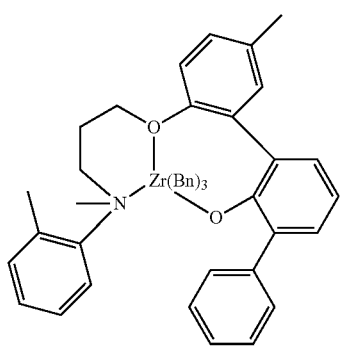
75

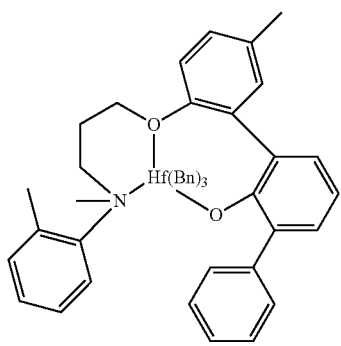
76

In at least one embodiment, the catalyst compound represented by formula (I) is selected from:

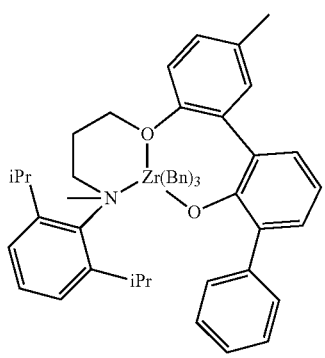
39

In at least one embodiment, one or more different catalyst compounds are present in a catalyst system. In at least one embodiment, one or more different catalyst compounds are present in the reaction zone where the process(es) described herein occur. When at least two transition metal compound based catalysts are used in one reactor as a mixed catalyst system, the two transition metal compounds can be chosen such that the two are compatible. A simple screening method such as by $^1$H or $^{13}$C NMR, known to those of ordinary skill in the art, can be used to determine which transition metal compounds are compatible. The same activator can be used for the transition metal compounds, however, two different activators, such as a non-coordinating anion activator and an alumoxane, can be used in combination. If one or more transition metal compounds contain an X ligand which is not a hydride, hydrocarbyl, or substituted hydrocarbyl, then the alumoxane should be contacted with the transition metal compounds prior to addition of the non-coordinating anion activator.

The two transition metal compounds (pre-catalysts) may be used in any ratio. Molar ratios of (A) transition metal compound to (B) transition metal compound can be a range of (A:B) of from 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In at least one embodiment, when using the two pre-catalysts, where both are activated with the same activator, mole percentages, based upon the molecular weight of the pre-catalysts, can be from 10% to 99.9% A to 0.1% to 90% B, alternatively 25% to 99% A to 0.5% to 75% B, alternatively 50% to 99% A to 1% to 50% B, and alternatively 75% to 99% A to 1% to 10% B.

Methods to Prepare the Catalyst Compounds

The following is a generic scheme to prepare the catalysts described herein and further exemplified in the examples. Generally, catalyst compounds of this type can be synthesized as shown below (Schemes 1 and 2) where the desired ligand will be further complexed to the tetrabenzyl-M (with M=Zr or Hf). Ligands can be prepared as follows (Scheme 1): alkylation of 2,6-diisopropylaniline with bromopropanol in the presence of potassium carbonate is followed by the conversion of an alcohol via Phenolic Mitsunobu reaction with 2'-(methoxymethyl)-5-methyl-[1,1':3',1"-terphenyl]-2-ol in the presence of triphenylphosphine and diisopropyl azodicarboxylate (DIAD) or diethylazodicarboxylate (DEAD). The formation of resulting product is followed by a deprotection step under acidic condition and the resulting anilinyl phenol can undergo methylation of the secondary amine in the presence of formaldehyde and sodium cyanoborohydride, in order to afford the desired ligand.

Scheme 1. Bridged Anilinyl Phenyl Phenol Catalyst Compounds 39 (M = Zr) and 40 (M = Hf)

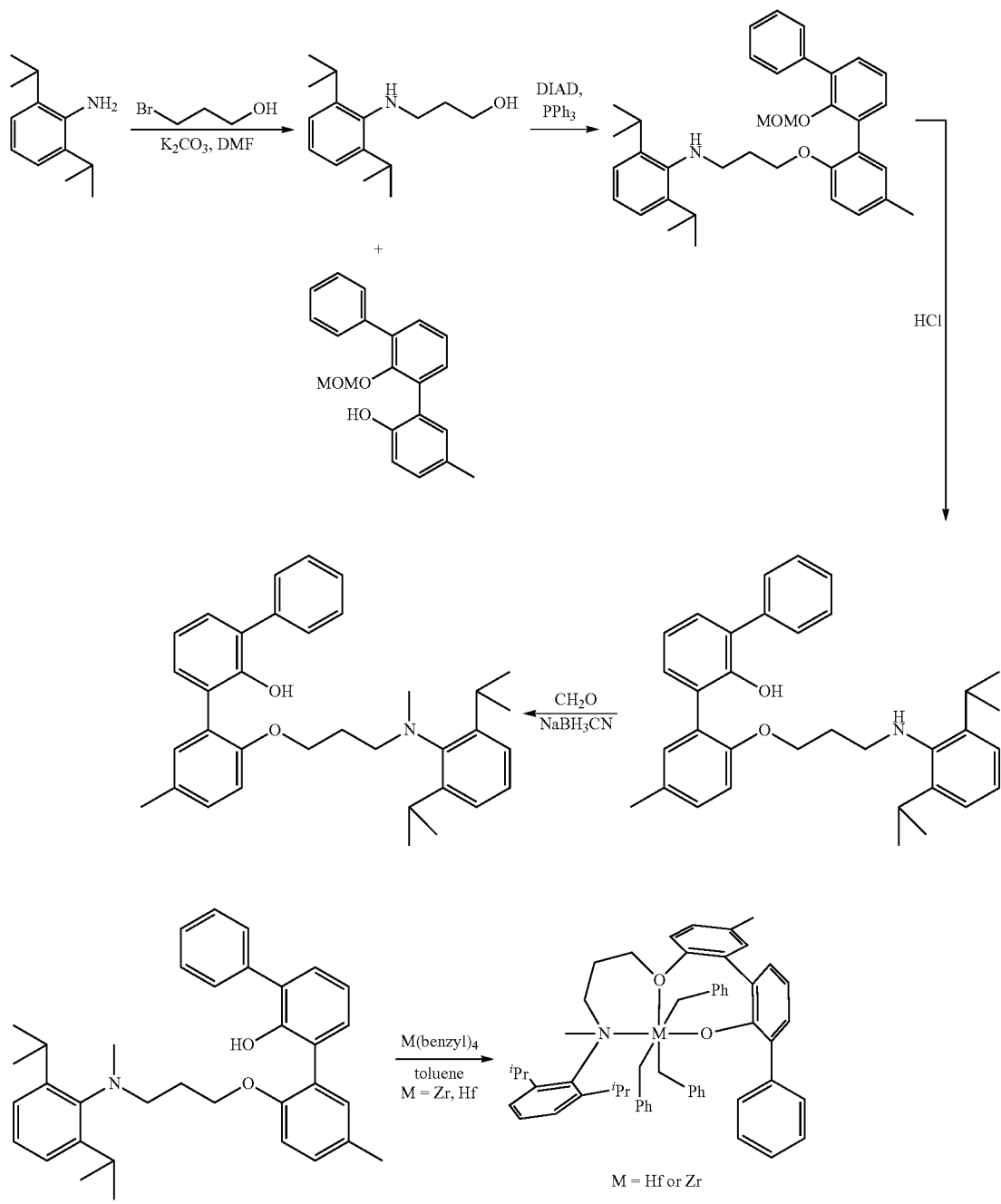

Ligands can be prepared as follow (Scheme 2a): alkylation of 2,6-diisopropylaniline with bromopropanol in the presence of potassium carbonate is followed by the conversion of the resulting alcohol into a protected ether via Phenolic Mitsunobu reaction with 2'-(methoxymethoxy)-5-methyl-[1,1':3',1''-terphenyl]-2-ol in the presence of triphenylphosphine and diisopropyl azodicarboxylate (DIAD) or diethylazodicarboxylate (DEAD). The formation of the resulting product is then followed by a deprotection step under acidic conditions and the resulting anilinyl phenol can undergo metallation with tetrabenzyl-M (with M=Zr or Hf).

Scheme 2a. Bridged Anilinyl Phenyl Phenol Catalyst Compounds 1 (M = Zr) and 2 (M = Hf)

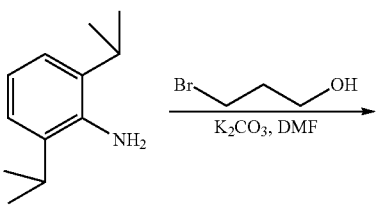

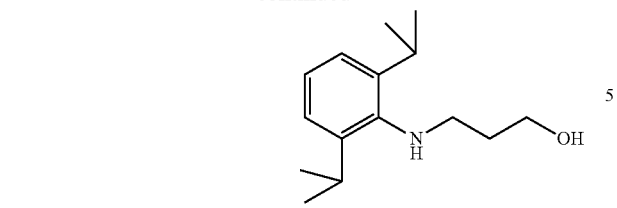

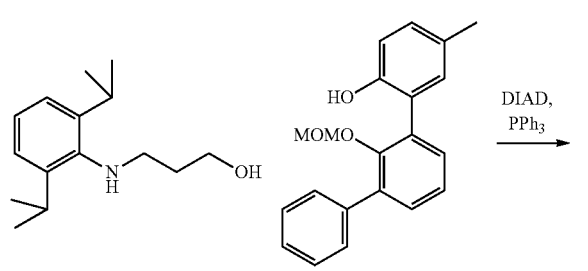

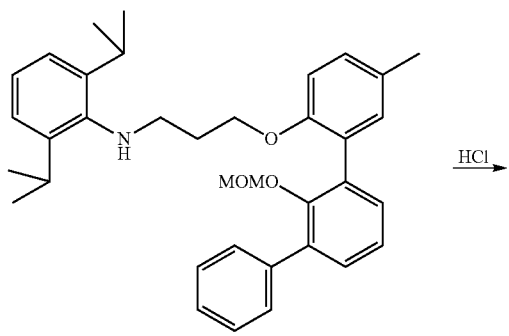

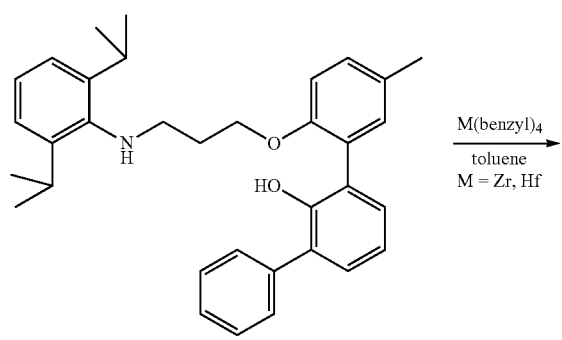

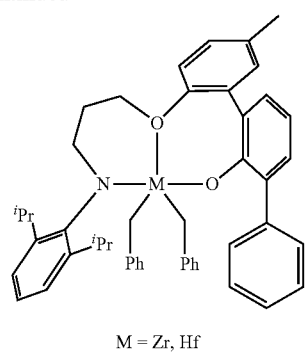

M = Zr, Hf

An alternate way for the synthesis of ligands for catalyst compounds 1 and 2 is illustrated in Scheme 2b. Under acidic condition, a 1,3-propanediol-ditosylate is reacted with a mixture of 2'-methoxy-5-methyl-[1,1':3',1''-terphenyl]-2-ol and cesium carbonate, leading to the formation of a tosylated intermediate, 3-((2'-methoxy-5-methyl-[1,1':3',1''-terphenyl]-2-yl)oxy)propyl 4-methylbenzenesulfonate. The latest is converted into a corresponding aniline intermediate, a 2,6-diisopropyl-N-(3-((2'-methoxy-5-methyl-[1,1':3',1''-terphenyl]-2-yl)oxy)-propyl)aniline, via simple reaction with 2,6-diisopropylaniline at 100° C. After purification, the resulting methoxy-protected aniline intermediate undergoes nucleophilic reaction with sodium ethanethiolate in order to de-protect the hydroxyl group, thus leading to the formation of an anilinyl phenol intermediate, 2-(3-((2,6-Diisopropylphenyl)amino)propoxy)-5-methyl-[1,1':3',1''-terphenyl]-2'-ol. The resulting anilinyl phenol can undergo metallation with tetrabenzyl-M (with M=Zr or Hf).

Scheme 2b. Alternate Synthesis for Bridged Anilinyl Phenyl Phenol Catalyst Compounds 1 (M = Zr) and 2 (M = Hf)

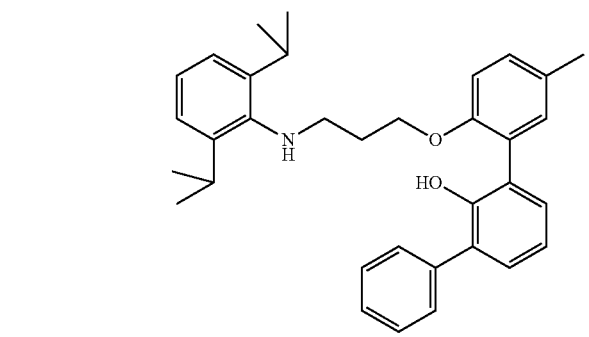

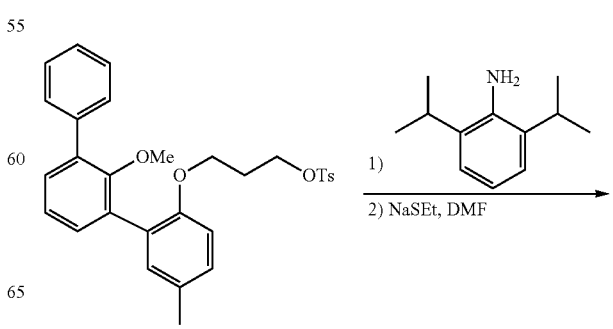

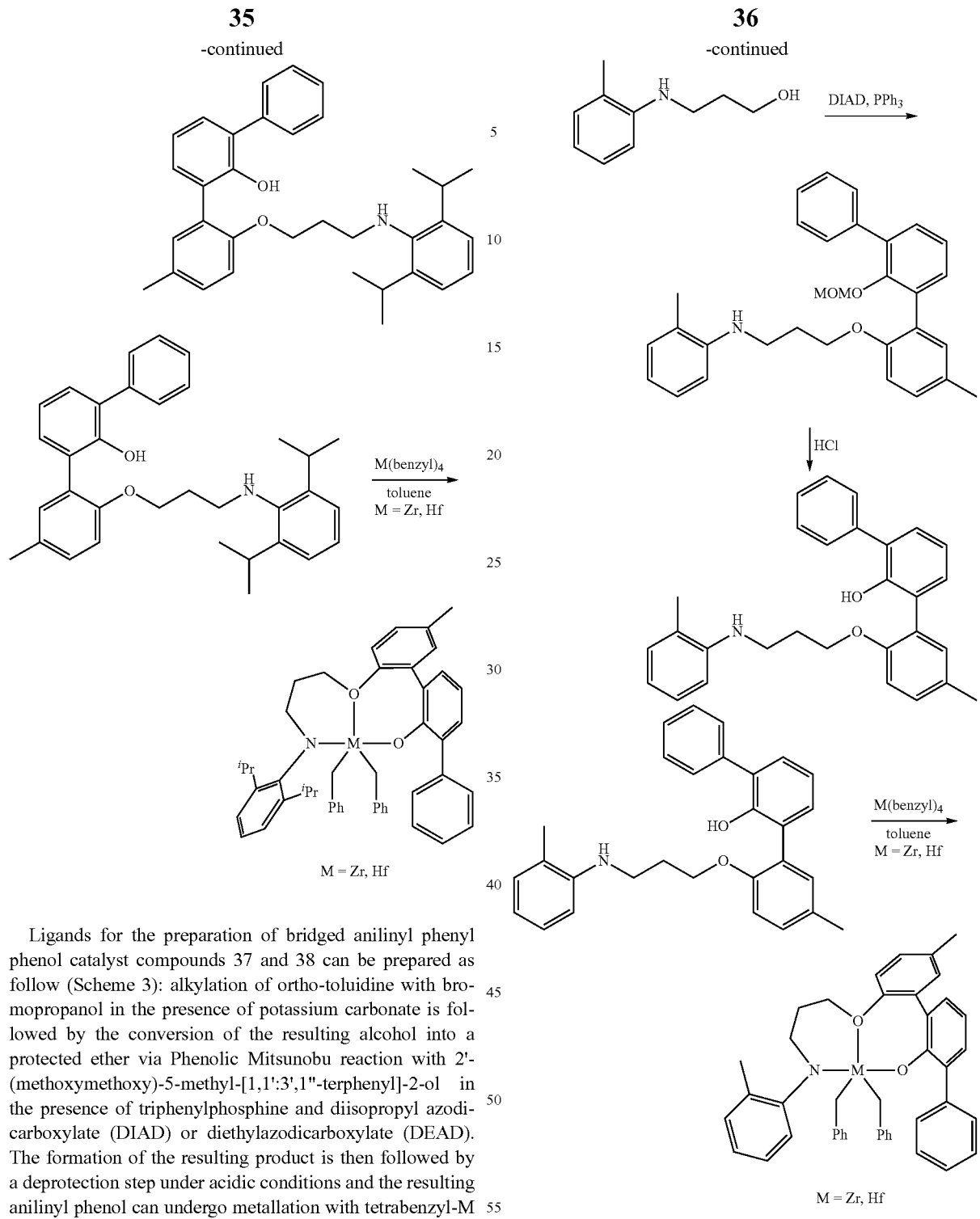

Ligands for the preparation of bridged anilinyl phenyl phenol catalyst compounds 37 and 38 can be prepared as follow (Scheme 3): alkylation of ortho-toluidine with bromopropanol in the presence of potassium carbonate is followed by the conversion of the resulting alcohol into a protected ether via Phenolic Mitsunobu reaction with 2'-(methoxymethoxy)-5-methyl-[1,1':3',1''-terphenyl]-2-ol in the presence of triphenylphosphine and diisopropyl azodicarboxylate (DIAD) or diethylazodicarboxylate (DEAD). The formation of the resulting product is then followed by a deprotection step under acidic conditions and the resulting anilinyl phenol can undergo metallation with tetrabenzyl-M (with M=Zr or Hf).

Scheme 3. Bridged Anilinyl Phenyl Phenol Catalyst
Compounds 37 (M = Zr) and 38 (M = Hf)

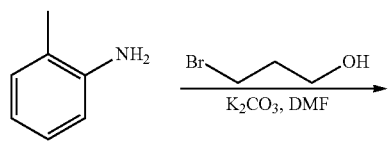

Activators

The terms "cocatalyst" and "activator" are used herein interchangeably and are defined to be a compound which can activate a catalyst compound of the present disclosure by converting the neutral catalyst compound to a catalytically active catalyst compound cation.

After the complexes described above have been synthesized, catalyst systems may be formed by combining them with activators in any suitable manner including by supporting them for use in slurry or gas phase polymerization. The catalyst systems may also be added to or generated in solution polymerization or bulk polymerization (in the monomer). Suitable catalyst system may include a complex as described above and an activator such as alumoxane or a non-coordinating anion.

Non-limiting activators, for example, include alumoxanes, aluminum alkyls, ionizing activators, which may be neutral or ionic, and conventional-type cocatalysts. Activators can include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In at least one embodiment, alumoxane activators are utilized as an activator in the catalyst system. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be suitable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). Another useful alumoxane is solid polymethylaluminoxane as described in U.S. Pat. Nos. 9,340,630; 8,404,880; and 8,975,209. Aluminum alkyls are available as hydrocarbon solutions from commercial sources. Methylalumoxane ("MAO") is available from Albemarle as a 30 wt % solution in toluene.

When the activator is an alumoxane (modified or unmodified), in at least one embodiment, select the maximum amount of activator at up to a 5,000-fold molar excess Al/M over the catalyst compound (per metal catalytic site). The minimum activator-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. For example, alumoxane is present at zero mol %, alternately the alumoxane is present at a molar ratio of aluminum to catalyst compound transition metal less than 500:1, such as less than 300:1, such as less than 100:1, such as less than 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

"Compatible" non-coordinating anions can be those which are not degraded to neutrality when the initially formed complex decomposes. Further, the anion might not transfer an anionic substituent or fragment to the cation so as to cause it to form a neutral transition metal compound and a neutral by-product from the anion. Non-coordinating anions can be those that are compatible, stabilize the transition metal cation in the sense of balancing its ionic charge at +1, and yet retain sufficient lability to permit displacement during polymerization.

Activation may be performed using non-coordinating anions (NCAs) of the type, for example, described in EP 277 003 A1 and EP 277 004 A1. NCA may be added in the form of an ion pair using, for example, [DMAH]+[NCA]− in which the N,N-dimethylanilinium ("DMAH") cation reacts with a basic leaving group on the transition metal complex to form a transition metal complex cation and [NCA]−. The cation in the precursor may, alternatively, be trityl. Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis (pentafluorophenyl)borate (i.e., [PhNMe$_2$H]B($C_6F_5$)$_4$) and N,N-dimethylanilinium tetrakis (heptafluoronaphthyl) borate, where Ph is phenyl, and Me is methyl.

It is within the scope of the present disclosure to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 1998/043983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator. In at least one embodiment, boron containing NCA activators represented by the formula below can be used:

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand transition metal catalyst precursor, resulting in a cationic transition metal species.

The activating cation $Z_d^+$ may also be a moiety such as silver, tropylium, carboniums, ferroceniums and mixtures, such as carboniums and ferroceniums. $Z_d^+$ can be triphenyl carbonium. Reducible Lewis acids can be a triaryl carbonium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted $C_1$ to $C_{40}$ hydrocarbyl), such as the reducible Lewis acids in formula (14) above as "Z" include those represented by the formula: ($Ph_3C$), where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbonium.

When $Z_d^+$ is the activating cation $(L-H)_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dl'imethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]d^-$ where k is 1, 2, or 3; n is 1, 2, 3, 4, 5, or 6 (such as 1, 2, 3, or 4); n–k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Each Q can be a fluorinated hydrocarbyl group having 1 to 20 carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

The ionic stoichiometric activator $Z_d^+$ $(A^{d-})$ can be one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

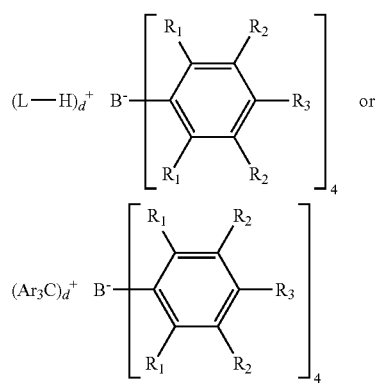

where:
each $R_1$ is independently a halide, such as a fluoride;
Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;
each $R_2$ is independently a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_3$ is a fluoride or a $C_6$ perfluorinated aromatic hydrocarbyl group); where $R_2$ and $R_3$ can form one or more saturated or unsaturated, substituted or unsubstituted rings (such as $R_2$ and $R_3$ form a perfluorinated phenyl ring); and
L is a neutral Lewis base; $(L-H)^+$ is a Bronsted acid; d is 1, 2, or 3;
where the anion has a molecular weight of greater than 1020 g/mol; and
where at least three of the substituents on the B atom each have a molecular volume of greater than 250 cubic Å, alternately greater than 300 cubic Å, or alternately greater than 500 cubic Å.

For example, $(Ar_3C)_d^+$ can be $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v.71(11), November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Exemplary activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)_4^-]$, 1-(4-(tris(pentafluorophenyl)borate)-2,3,5,6-tetrafluorophenyl)pyrrolidinium, and tetrakis(pentafluorophenyl)borate, 4-(tris(pentafluorophenyl)borate)-2,3,5,6-tetrafluoropyridine.

In at least one embodiment, the activator includes a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, and triphenylcarbenium tetrakis(3,5-bis(trifluoromethyl)phenyl)borate).

In another embodiment, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, and di-(i-propyl)ammonium tetrakis(pentafluorophenyl)borate (where alkyl is methyl, ethyl, propyl, n-butyl, sec-butyl, or t-butyl).

Suitable activator-to-catalyst ratio, e.g., all NCA activators-to-catalyst ratio may be about a 1:1 molar ratio. Alternate ranges include from 0.1:1 to 100:1, alternately from 0.5:1 to 200:1, alternately from 1:1 to 500:1, alternately from 1:1 to 1000:1. A particularly useful range is from 0.5:1 to 10:1, such as 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 which discuss the use of an alumoxane in combination with an ionizing activator).

Useful chain transfer agents can be alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may include an inert support material. The supported material can be a porous support material, for example, talc, and inorganic oxides. Other support materials include zeolites, clays, organoclays, or another organic or inorganic support material and the like, or mixtures thereof.

The support material can be an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titanic, and the like. Support materials include $Al_2O_3$, $ZrO_2$, $SiO_2$, and combinations thereof, such as $SiO_2$, $Al_2O_3$, or $SiO_2/Al_2O_3$.

The support material, such as an inorganic oxide, can have a surface area in the range of from about 10 $m^2$/g to about 700 $m^2$/g, pore volume in the range of from about 0.1 $cm^3$/g to about 4.0 $cm^3$/g and average particle size in the range of from about 5 µm to about 500 µm. The surface area of the support material can be in the range of from about 50 $m^2$/g to about 500 $m^2$/g, pore volume of from about 0.5 $cm^3$/g to about 3.5 $cm^3$/g and average particle size of from about 10 µm to about 200 µm. For example, the surface area of the support material is in the range is from about 100 $m^2$/g to about 400 $m^2$/g, pore volume from about 0.8 $cm^3$/g to about 3.0 $cm^3$/g and average particle size is from about 5 µm to about 100 µm. The average pore size of the support material useful in the present disclosure is in the range of from 10 Å to 1000 Å, such as 50 Å to about 500 Å, and such as 75 Å to about 350 Å. In at least one embodiment, the support material is a high surface area, amorphous silica (surface area=300 $m^2$/gm; pore volume of 1.65 $cm^3$/gm). Silicas can be marketed under the tradenames of DAVISON 952 or DAVISON 955 by the Davison Chemical Division of W.R. Grace and Company. In other embodiments DAVISON 948 is used. Alternatively, a silica can be ES-70™ silica (PQ Corporation, Malvern, Pa.) that has been calcined at 875° C.

The support material should be dry, that is, free of absorbed water. Drying of the support material can be effected by heating or calcining at about 100° C. to about 1,000° C., such as at least about 600° C. When the support material is silica, it is heated to at least 200° C., such as about 200° C. to about 850° C., and such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of the present disclosure. The calcined support material is then contacted with at least one polymerization catalyst comprising at least one catalyst compound and an activator.

The support material, having reactive surface groups, such as hydroxyl groups, is slurried in a non-polar solvent and the resulting slurry is contacted with a solution of a catalyst compound and an activator. In at least one embodiment, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In at least one embodiment, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst compound, activator and support is heated to about 0° C. to about 70° C., such as about 23° C. to about 60° C., such as at room temperature. Contact times may range from about 0.5 hours to about 24 hours, from about 2 hours to about 16 hours, or from about 4 hours to about 8 hours.

Suitable non-polar solvents are materials in which all of the reactants used herein, i.e., the activator and the catalyst compound, are at least partially soluble and which are liquid at reaction temperatures. Non-polar solvents can be alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In at least one embodiment, the support material includes a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof and the electron-withdrawing anion is selected from fluoride, chloride, bromide, phosphate, triflate, bisulfate, sulfate, or a combination thereof.

The electron-withdrawing component used to treat the support material can be a component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or a combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can include, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, one or more of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, $H^+$, $[H(OEt_2)_2]^+$, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In at least one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, such as a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

The present disclosure relates to polymerization processes where monomer (such as propylene), and optionally comonomer, are contacted with a catalyst system comprising an activator and at least one catalyst compound, as described above. The catalyst compound and activator may be combined in any order, and are combined prior to contacting with the monomer.

Monomers include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes propylene and an optional comonomer comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer includes ethylene and an optional comonomer comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein at up to 10 wt %, such as at 0.00001 wt % to 1.0 wt %, such as 0.002 wt % to 0.5 wt %, such as 0.003 wt % to 0.2 wt %, based upon the total weight of the composition. In at least one embodiment, 500 ppm or less of diene is added to the polymerization, such as 400 ppm or less, such as 300 ppm or less. In other embodiments, at least 50 ppm of diene is added to the polymerization, or 100 ppm or more, or 150 ppm or more.

Diolefin monomers include any suitable hydrocarbon structure, such as $C_4$ to $C_{30}$, having at least two unsaturated bonds, where at least two of the unsaturated bonds are readily incorporated into a polymer by either a stereospecific or a non-stereospecific catalyst(s). The diolefin monomers can be selected from alpha, omega-diene monomers (i.e., di-vinyl monomers). The diolefin monomers can be linear di-vinyl monomers, such as those containing from 4 to 30 carbon atoms. Dienes can include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, for example dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes can include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be used. (A homogeneous polymerization process is a process where at least 90 wt % of the product is soluble in the reaction media.) A bulk homogeneous process can be used. (A bulk process is a process where monomer concentration in all feeds to the reactor is 70 volume % or more.) Alternately, no solvent or diluent is present or added in the reaction medium, (except for the small amounts used as the carrier for the catalyst system or other additives, or amounts found with the monomer; e.g., propane in propylene). In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. In at least one embodiment, the polymerization is run in a bulk process.

Polymerizations can be run at any temperature and/or pressure suitable to obtain the desired ethylene polymers. Suitable temperatures and/or pressures include a temperature in the range of from about 0° C. to about 300° C., such as about 20° C. to about 200° C., such as about 35° C. to about 150° C., such as from about 40° C. to about 120° C., such as from about 45° C. to about 80° C.; and at a pressure in the range of from about 0.35 MPa to about 10 MPa, such as from about 0.45 MPa to about 6 MPa, such as from about 0.5 MPa to about 4 MPa, such as from about 0.55 MPa to about 3 MPa, such as from about 0.60 MPa to about 2 MPa, such as from about 0.65 MPa to about 1 MPa (such as from about 0.95 psig to about 145 psig).

In a suitable polymerization, the run time of the reaction is up to 300 minutes, such as from about 5 minutes to 250 minutes, such as from about 10 minutes to 120 minutes, such as from about 20 minutes to 90 minutes, such as from about 30 minutes to 60 minutes.

In at least one embodiment, the present disclosure provides a process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system described above in at least one solution polymerization reactor at a reactor pressure of from 2 MPa to 200 MPa and a reactor temperature of from 10° C. to 250° C. to form an ethylene alpha-olefin copolymer.

In at least one embodiment, hydrogen is present in the polymerization reactor at a partial pressure of from 0.001 psig to 50 psig (0.007 to 345 kPa), such as from 0.01 psig to 25 psig (0.07 kPa to 172 kPa), such as 0.1 psig to 10 psig (0.7 kPa to 70 kPa).

In at least one embodiment, the activity of the catalyst is at least 50 g/mmol/hour, such as 500 or more g/mmol/hour, such as 5,000 or more g/mmol/hr, such as 50,000 or more g/mmol/hr, such as 100,000 or more g/mmol/hr, such as 400,000 or more g/mmol/hr, such as 450,000 or more g/mmol/hr.

In at least one embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, little or no alumoxane is used in the process to produce the polymers. For example, alumoxane is present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. For example, scavenger (such as tri alkyl aluminum) is present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of 0 to 300° C. (such as 25 to 150° C., such as 40 to 120° C., such as 45 to 80° C.); 2) is conducted at a pressure of atmospheric pressure to 10 MPa (such as 0.35 to 10 MPa, such as from 0.45 to 6 MPa, such as from 0.5 to 4 MPa, such as from 0.65 to 1 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics are present in the solvent at less than 1 wt %, such as less than 0.5 wt %, such as at 0 wt % based upon the weight of the solvents), such as isohexane; 4) where the catalyst system used in the polymerization includes less than 0.5 mol %, such as 0 mol % alumoxane, alternately the alumoxane is present at a molar ratio of aluminum to transition metal less than 500:1, such as less than 300:1, such as less than 100:1, such as less than 1:1; or less than 2.0 equivalent of DMAH-PFPB, such as less than 1.5 equivalents, such as 1.1 equivalents; 5) the polymerization occurs in one reaction zone; 6) the activity of the catalyst compound is at least 10 Kg/mmol/hour (such as at least 100 Kg/mmol/hour, such as at least 250 Kg/mmol/hour, such as at least 400 Kg/mmol/hour); 7) optionally scavengers (such as trialkyl aluminum compounds) are absent (e.g., present at zero mol %, alternately the scavenger is present at a molar ratio of scavenger metal to transition metal of less than 100:1, such as less than 50:1, such as less than 15:1, such as less than 10:1); and 8) optionally, hydrogen is present in the polymerization reactor at a partial pressure of 0.001 to 50 psig (0.007 to 345 kPa) (such as from 0.01 to 25 psig (0.07 to 172 kPa), such as 0.1 to 10 psig (0.7 to 70 kPa)). In at least one embodiment, the catalyst system used in the polymerization includes no more than one catalyst compound. A "reaction zone" also referred to as a "polymerization zone" is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is 23° C. unless otherwise noted.

Other additives may also be used in the polymerization, such as one or more scavengers, promoters, modifiers, chain transfer agents (such as diethyl zinc), reducing agents, oxidizing agents, hydrogen, aluminum alkyls, or silanes.

Chain transfer agents include alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl, octyl or an isomer thereof), or a combination thereof, such as diethyl zinc, methylalumoxane, trimethylaluminum, triisobutylaluminum, trioctylaluminum, or a combination thereof.

Polyolefin Products

The present disclosure relates to compositions of matter produced by the methods described herein.

In at least one embodiment, a process described herein produces $C_2$ to $C_{20}$ olefin homopolymers or copolymers, such as ethylene-octene, ethylene-propylene and/or propylene-alpha-olefin (such as $C_3$ to $C_{20}$) copolymers (such as propylene-hexene copolymers or propylene-octene copolymers) having low comonomer incorporation (such as $C_6$ wt %) and/or broad molecular weight distribution, e.g. a higher Mw/Mn.

In at least one embodiment, the process for the production of an ethylene alpha-olefin copolymer includes: polymerizing ethylene and at least one $C_3$-$C_{20}$ alpha-olefin by contacting the ethylene and the at least one $C_3$-$C_{20}$ alpha-olefin with a catalyst system as described above in at least one solution polymerization reactor at a reactor pressure of from 2 MPa to 200 MPa and a reactor temperature of from 10° C. to 250° C. to form an ethylene alpha-olefin copolymer.

In at least one embodiment, the copolymer is ethylene alpha-olefin copolymer with an Mw value of 50,000 g/mol or greater, 100,000 g/mol or greater, such as 200,000 g/mol or greater, 300,000 g/mol or greater.

In at least one embodiment, the copolymer is ethylene alpha-olefin copolymer with an Mw value from 10,000 g/mol to 500,000 g/mol, such as from 15,000 g/mol to 250,000 g/mol, such as from 20,000 g/mol to 185,000 g/mol.

In at least one embodiment, the copolymer is ethylene alpha-olefin copolymer with an Mw/Mn value of 5 or less, such as from 4 to 1, such as from 3 to 1, such as from 2.5 to 1.

In at least one embodiment, the ethylene alpha-olefin copolymer has a comonomer content of from 3.5 wt % to 12 wt %, such as from 4.5 wt % to 11.5 wt %, such as from 5.5 wt % to 11 wt %, such as from 6.5 wt % to 10.5 wt %, such as from 8 wt % to 10 wt %.

In at least one embodiment, a polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Differential Scanning calorimetry. Melting Temperature, Tm, is measured by differential scanning calorimetry ("DSC") using a DSCQ200 unit. The sample is first equilibrated at 25° C. and subsequently heated to 220° C. using a heating rate of 10° C./min (first heat). The sample is held at 220° C. for 3 minutes. The sample is subsequently cooled down to −100° C. with a constant cooling rate of 10° C./minute (first cool). The sample is equilibrated at −100° C. before being heated to 220° C. at a constant heating rate of 10° C./minute (second heat). The exothermic peak of crystallization (first cool) is analyzed using the TA Universal Analysis software and the corresponding to 10° C./minute cooling rate is determined. The endothermic peak of melting (second heat) is also analyzed using the TA Universal Analysis software and the peak melting temperature (Tm) corresponding to 10° C./minute heating rate is determined.

Blends

In another embodiment, the polymer (such as the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as the polyethylene or polypropylene) is present in the above blends, at from 10 wt % to 99 wt %, based upon the weight of the polymers in the blend, such as 20 wt % to 95 wt %, such as at least 30 wt % to 90 wt %, such as at least 40 to 90 wt %, such as at least 50 wt % to 90 wt %, such as at least 60 to 90 wt %, such as at least 70 wt % to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Specifically, one or more of the foregoing polymers, such as the foregoing polyethylenes or blends thereof, may be used in a variety of end-use applications. Such applications include, for example, mono- or multi-layer blown, extruded, and/or shrink films. These films may be formed by any suitable extrusion or coextrusion technique, such as a blown bubble film processing technique, where the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. The films can be oriented in the Machine Direction (MD) at a ratio of up to 15, such as from 5 to 7, and in the Transverse Direction (TD) at a ratio of up to 15, such as from 7 to 9. However, in another embodiment, the film is oriented to the same extent in both the MD and TD directions.

The films may vary in thickness depending on the intended application; however, films of a thickness from 1 μm to 50 μm are usually suitable. Films intended for packaging are usually from 10 μm to 50 μm thick. The thickness of the sealing layer may be from 0.2 μm to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In at least one embodiment, one or both of the surface layers is modified by corona treatment.

In another embodiment, this invention relates to:
1. A catalyst compound represented by Formula (I):

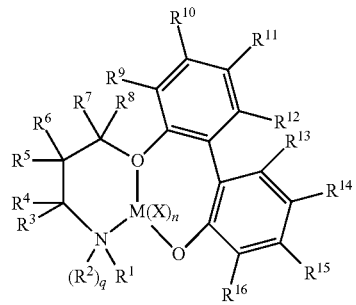

wherein: M is a group 4 metal; each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, or $R^{16}$ are joined together to form a $C_4$-$C_{62}$ cyclic or polycyclic ring structure, or a combination thereof; each X is independently $C_1$-$C_{20}$ hydrocarbyl, $C_1$-$C_{20}$ substituted hydrocarbyl, a heteroatom or a heteroatom-containing group, or two or more Xs join together to form a $C_4$-$C_{62}$ cyclic or polycyclic ring structure; q is 0 or 1; and n is 2 or 3, wherein when q is 0, then n is 2, and when q is 1, then n is 3.
2. The catalyst compound of paragraph 1, wherein q is 1.
3. The catalyst compound of paragraph 2, wherein $R^2$ is hydrogen or $C_1$-$C_{40}$ hydrocarbyl.
4. The catalyst compound of paragraph 3, wherein $R^2$ is $C_1$-$C_{10}$ hydrocarbyl.
5. The catalyst compound of any of paragraphs 1 to 4, wherein $R^1$ is represented by the structure:

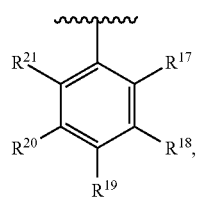

wherein each of $R^{17}$, $R^{18}$, $R^{19}$, $R^{20}$, and $R^{21}$ is independently selected from hydrogen, $C_1$-$C_{40}$ hydrocarbyl, $C_1$-$C_{40}$ substituted hydrocarbyl, a heteroatom or a heteroatom-containing group, or two or more of $R^{17}$, $R^{18}$, $R^{19}$, $R^{20}$, and $R^{21}$ are joined together to form a $C_4$-$C_{62}$ cyclic or polycyclic ring structure, or a combination thereof.
6. The catalyst compound of paragraph 5, wherein each of $R^{17}$, $R^{18}$, $R^{19}$, $R^{20}$, and $R^{21}$ is independently selected from hydrogen and $C_1$-$C_{40}$ hydrocarbyl.
7. The catalyst compound of paragraph 6, wherein each of $R^{17}$ and $R^{21}$ is $C_1$-$C_{10}$ hydrocarbyl.
8. The catalyst system of paragraph 7, wherein each of $R^{18}$, $R^{19}$, and $R^{20}$ is hydrogen.
9. The catalyst system of any of paragraphs 1 to 7, wherein $R^{16}$ is selected from unsubstituted phenyl, substituted phenyl, unsubstituted carbazole, substituted carbazole, unsubstituted naphthyl, substituted naphthyl, unsubstituted anthracenyl, substituted anthracenyl, unsubstituted fluorenyl, or substituted fluorenyl.
10. The catalyst system of paragraph 9, wherein $R^{16}$ is unsubstituted phenyl.
11. The catalyst system of paragraph 9, wherein $R^{16}$ is unsubstituted carbazole.
12. The catalyst compound of any of paragraphs 1 to 11, wherein each of $R^3$, $R^4$, $R^5$, $R^6$, $R^7$, and $R^8$ is independently hydrogen and $C_1$-$C_{10}$ hydrocarbyl.
13. The catalyst compound of paragraph 12, wherein three or more of $R^3$, $R^4$, $R^5$, $R^6$, $R^7$, and $R^8$ are hydrogen.
14. The catalyst compound of paragraph 13, wherein each of $R^3$, $R^4$, $R^5$, $R^6$, $R^7$, and $R^8$ is hydrogen.
15. The catalyst compound of any of paragraphs 1 to 14, wherein M is Zr or Hf.
16. The catalyst compound of any of paragraphs 1 to 15, wherein each X is methyl, benzyl, or chloro.
17. The catalyst compound represented by formulas 1 to 38 as shown above.
18. A catalyst compound represented by the formulas 1 or 2.

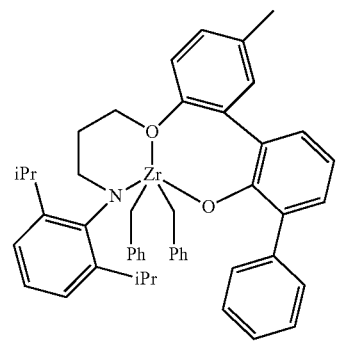

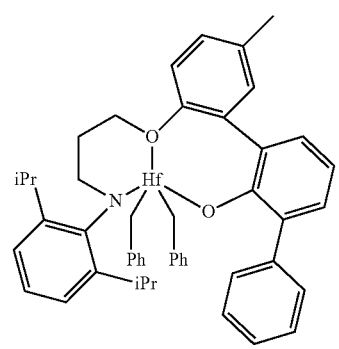

19. The catalyst compound of paragraph 1, wherein the catalyst compound is one or more of compounds 39 to 76 as described above.
20. The catalyst composition of paragraph 1, wherein $R^1$ is substituted phenyl and $R^{16}$ is phenyl or unsubstituted phenyl.
21. A catalyst system comprising an activator and the catalyst compound of any of paragraphs 1-20.
22. The catalyst system of paragraph 21, further comprising a support material.
23. The catalyst system of paragraph 22, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.
24. The catalyst system of any of paragraphs 21-23, wherein the activator comprises an alkylalumoxane.
25. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of any of paragraphs 21 to 24 in at least one solution polymerization reactor at a reactor pressure of from 2 MPa to 200 MPa and a reactor temperature of from 10° C. to 250° C. to form an ethylene alpha-olefin copolymer.

26. The process of paragraph 25, wherein the catalyst has an activity of 10,000 g/mmol/hour or greater.

27. The process of paragraph 26, wherein the catalyst has an activity of 100,000 g/mmol/hour or greater.

28. The process of paragraph 27, wherein the catalyst has an activity of 400,000 g/mmol/hour or greater.

29. The process of any of paragraphs 25 to 28, wherein the ethylene alpha-olefin copolymer has an Mw value of from 100,000 to 300,000 g/mol or greater.

30. The process of any of paragraphs 25 to 29, wherein the ethylene alpha-olefin copolymer has an Mw/Mn value of 5 or less.

31. The process of paragraph 28, wherein the ethylene alpha-olefin copolymer has an Mw/Mn value of from 1 to 2.5.

32. The process of any of paragraphs 25 to 31, wherein the ethylene alpha-olefin copolymer has a comonomer content of from 7 wt % to 12 wt %.

33. The process of paragraph 32, wherein the ethylene alpha-olefin copolymer has a comonomer content of from 8 wt % to 10 wt %.

34. The process of paragraph 25, wherein the catalyst has a catalyst activity of 400,000 gP/mmolCat·h$^{-1}$ or greater and the ethylene alpha-olefin copolymer has a comonomer content of from about 3.5 wt % to 8.5 wt %, an Mn of about 15,000 g/mol to about 140,000 g/mol, an Mw of from about 100,000 g/mol to about 300,000 g/mol, and a Mw/Mn of from 1 to 2.5.

Experimental

All anhydrous solvents were purchased from Sigma Aldrich and were degassed and dried over molecular sieves prior to use. Deuterated solvents were purchased from Cambridge Isotope Laboratories and dried over molecular sieves prior to use.

MAO was obtained as a 30 wt % MAO in toluene solution from Albemarle (e.g., 13.6 wt % Al or 5.04 mmol/g). $^1$H NMR data were collected on a Bruker AVANCE III 400 MHz or Bruker 500 MHz spectrometer running Topspin™ 3.0 software at room temperature (RT) using a deuterated solvent for all materials.

Slurry and solvent liquid ratios are given as weight ratios relative to the starting silica material, e.g., raw silica or silica supported MAO and/or catalyst. For example, if it is stated "the silica was slurried in 5× toluene," it means that the silica was slurried in 5 g of toluene for every 1 g of silica.

EXAMPLES

Synthesis of the Catalysts

General considerations: All reagents were purchased from commercial vendors (Aldrich) and used as received unless otherwise noted. Solvents were sparged with $N_2$ and dried over 3 Å molecular sieves. Tetrabenzyl hafnium and tetrabenzyl zirconium were purchased from Strem Chemicals. All chemical manipulations were performed in a nitrogen environment unless otherwise stated. Flash column chromatography was carried out with Sigma Aldrich Silica gel 60 Å (70-230 Mesh) using solvent systems specified. NMR spectra were recorded on a Bruker 400 and/or 500 NMR with chemical shifts referenced to residual solvent peaks. DIAD=Diisopropyl azodicarboxylate.

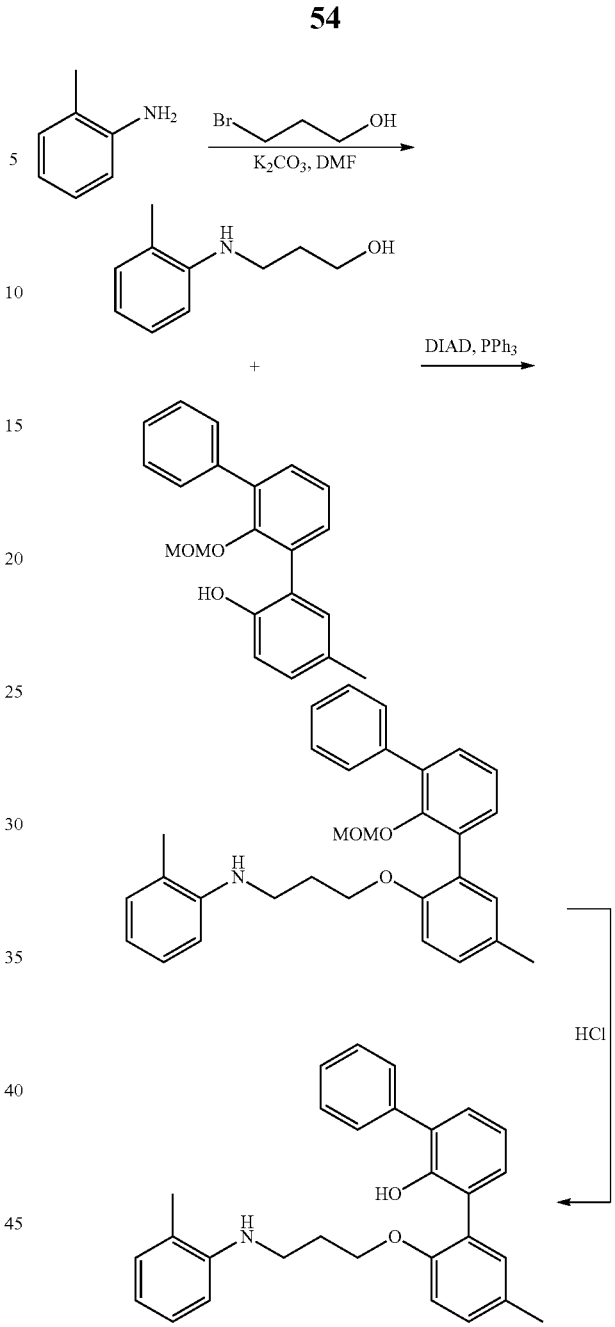

3-(o-tolylamino)propan-1-ol: Ortho-toluidine (5 mL, 46 mmol) and bromopropanol (4.2 g, 46 mmol) were combined and heated at 90° C. for 7 hours. The reaction was cooled to ambient temperature and dissolved in ethyl acetate. The solution was washed with 1 N NaOH and brine, then dried over MgSO$_4$, filtered, and concentrated. The residue was purified by silica gel column chromatography (30% acetone/isohexane) to give the product as a pale yellow oil in 54% yield: $R_f$=0.24 (30:70 acetone/isohexane); $^1$H NMR (400 MHz, CDCl$_3$, δ): 1.91 (m, 2H), 2.13 (s, 3H), 3.13 (br s, 1H), 3.29 (t, J=6.4 Hz, 2H), 3.79 (t, J=6.0 Hz, 2H), 6.66 (m, 2H), 7.07 (m, 2H); $^{13}$C NMR: 17.2, 31.9, 41.0, 60.6, 110.8, 116.5, 122.5, 127.9, 131.1, 146.4; IR (cm$^{-1}$): 3395, 3017, 2933, 2876, 1605, 1513, 1317, 1262, 1050, 747.

5-methyl-2-(3-(o-tolylamino)propoxy)-[1,1':3',1''-terphenyl]-2'-ol: The above alcohol (2.0 g, 1.2 mmol), 2'-(methoxymethoxy)-5-methyl-[1,1':3',1''-terphenyl]-2-ol (2.6 g, 8.1 mmol), and triphenylphenol (2.1 g, 8.1 mmol) were dissolved in 20 mL of THF. Diisopropyl azodicarboxylate (1.7 mL, 8.9 mmol) was added slowly and the reaction stirred at ambient temperature overnight. The reaction was quenched with saturated ammonium chloride and extracted with ethyl acetate. The organic portion was dried over $MgSO_4$, filtered, and concentrated under reduced pressure to give a yellow solid, which was purified by column chromatography (20% acetone/isohexane). The MOM protected phenol (approx. 150 mg) was dissolved in 5 mL THF/MeOH and 4 drops of conc. HCl was added. The reaction was stirred at ambient overnight, then quenched with saturated sodium bicarbonate. Ethyl acetate was added and the layers separated, the organic portion was washed with brine, dried ($MgSO_4$), filtered, and concentrated. The resulting oil was purified by column chromatography (10% acetone/isohexane): $R_f$=0.23 (10% acetone/isohexane); $^1$H NMR (500 MHz, $CDCl_3$, δ): 1.99 (s, 3H), 2.05 (m, 2H), 2.37 (s, 3H), 3.23 (t, J=6.5 Hz, 2H), 4.12 (t, J=6.0 Hz, 2H), 6.18 (br s, 1H), 6.51 (m, 1H), 6.64 (m, 1H), 6.97 (m, 3H), 7.21 (m, 2H), 7.26 (m, 2H), 7.34 (m, 2H), 7.41 (m, 2H), 7.57 (m, 2H); $^{13}$C NMR: 17.4, 20.5, 28.7, 40.6, 67.7, 113.7, 120.7, 126.6-130.0 (17C), 131.8, 133.0, 138.5, 150.3, 153.2.

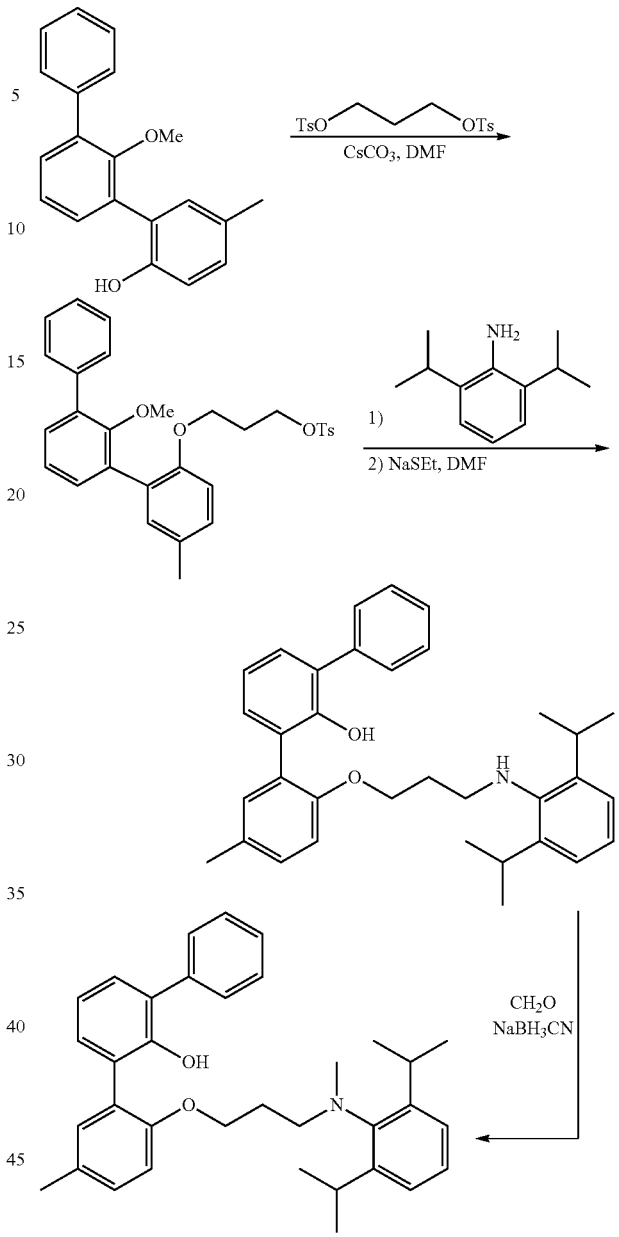

Metallation of 5-methyl-2-(3-(o-tolylamino)propoxy)-[1,1':3',1''-terphenyl]-2'-ol: In a nitrogen atmosphere, the above ligand was dissolved in 4 mL of toluene in a 20 mL vial. Tetrabenzyl zirconium or hafnium was dissolved in 4 mL of toluene in a separate vial. The solutions were combined and after 1 hour, filtered through a 0.2 μm syringe filter, the toluene was removed, and the residue slurried in pentane. The solids were collected and dried under vacuum.

3-((2'-Methoxy-5-methyl-[1,1':3',1''-terphenyl]-2-yl)oxy) propyl 4-methylbenzenesulfonate: A solution of 1,3-propanediol-ditosylate (4.61 g, 12.1 mmol) in DMF (30 mL) was added dropwise over 40 minutes at 0° C.-5° C. under nitrogen to a mixture of 2'-methoxy-5-methyl-[1,1':3',1''-terphenyl]-2-ol (2.92 g, 10.06 mmol) and cesium carbonate (4.9 g, 15.09 mmol) in DMF (30 mL). After stirring overnight, the reaction mixture was diluted with ethyl acetate (200 mL) and washed with water (100 mL) and saturated brine (100 mL). The organic layer was dried over sodium sulfate and concentrated under reduced pressure. The residue was purified on an AnaLogixs system (220 g column), eluting with a gradient of 0% to 20% ethyl acetate in heptanes, to give the desired product (3.3 g, 65% yield) as a brown viscous liquid.

2,6-Diisopropyl-N-(3-((2'-methoxy-5-methyl-[1,1':3',1''-terphenyl]-2-yl)oxy)-propyl)aniline: A mixture of the above tosylate (3.3 g, 6.57 mmol) and 2,6-diisopropylaniline (2.91 g, 16.43 mmol) was heated at 100° C. overnight under nitrogen. After cooling to room temperature, the mixture was diluted with ethyl acetate (100 mL) and washed with 1M sodium hydroxide (80 mL) and saturated brine (80 mL). The organic layer was dried over sodium sulfate and concentrated under reduced pressure. The residue was purified on an AnaLogixs system (220 g column), eluting with a gradient of 0% to 10% ethyl acetate in heptanes, to give the desired product (2.1 g, 63% yield) as a brown viscous liquid.

2-(3-((2,6-Diisopropylphenyl)amino)propoxy)-5-methyl-[1,1':3',1''-terphenyl]-2'-ol: The solution of the above compound (2.1 g, 4.14 mmol) in anhydrous DMF (30 mL) was sparged with nitrogen for 10 minutes. Sodium ethanethiolate (0.696, 8.28 mmol) was added at room temperature. The resultant mixture was stirred at room temperature for 20 minutes, then heated at 118° C. overnight under nitrogen. After cooling to room temperature, the mixture was diluted with ethyl acetate (120 mL) and washed with water (60 mL) and saturated brine (60 mL). The organic layer was dried over sodium sulfate and concentrated under reduced pressure. The residue was purified on an AnaLogixs system (120 g column), eluting with a gradient of 0% to 20% ethyl acetate in heptanes, to give the desired product (1.5 g, 73% yield) as a white solid. $^{13}C$ NMR: 20.5, 24.2 (4C), 27.6 (2C), 30.6, 48.5, 53.4, 67.9, 113.5, 120.6-138.7 (19C), 142.6, 143.1, 150.5, 153.1.

2-(3-((2,6-diisopropylphenyl)(methyl)amino)propoxy)-5-methyl-[1,1'':3',1''-terphenyl]-2'-ol: The above anilinyl phenol (0.54 g, 1.09 mmol) and a 40% aqueous solution of formaldehyde were dissolved in acetonitrile (5.0 mL). Sodium cyanoborohydride (0.117 g, 1.85 mmol) was added and the reaction stirred at room temperature for 1 hour. The pH was monitored and kept at pH 9 with the addition of acetic acid. The reaction was quenched with 1N NaOH, and extracted 3 times with ether. The combined organic layers were washed with 10% HCl and brine, then dried over $MgSO_4$ and concentrated under reduced pressure. The product was purified by silica gel chromatography (20% acetone/isohexane) and obtained in 97% yield as a clear, colorless oil: $R_f=0.64$ (20:80 acetone/isohexane); $^1H$ NMR (500 MHz, $CDCl_3$, δ): 1.10 (d, J=7.0 Hz, 6H), 1.16 (d, J=7.0 Hz, 6H), 1.90 (t, J=7.0 Hz, 2H), 2.36 (s, 3H), 2.69 (s, 3H), 3.06 (m, 2H), 3.30 (m, 2H), 4.08 (t, J=6.5 Hz, 2H), 6.41 (s, 1H), 6.94 (m, 1H), 7.04 (m, 3H), 7.20 (m, 4H), 7.32 (m, 2H), 7.42 (m, 2H), 7.57 (m, 2H); $^{13}C$ NMR: 20.5, 24.1 (2C), 24.7 (2C), 27.8 (2C), 29.3, 42.3, 53.6, 68.2, 113.4, 120.6-133.1 (18C), 138.8, 146.7, 148.8, 150.5, 153.0.

Metallation of 2-(3-((2,6-diisopropylphenyl)(methyl)amino)propoxy)-5-methyl-[1,1':3',1''-terphenyl]-2'-ol: In a nitrogen atmosphere, the above ligand was dissolved in 4 mL of toluene in a 20 mL vial. Tetrabenzyl zirconium or hafnium was dissolved in 4 mL of toluene in a separate vial. The solutions were combined and after 1 hour, filtered through a 0.2 μm syringe filter, the toluene was removed, and the residue slurried in pentane. The solids were collected and dried under vacuum.

Preparation of Supported Catalysts on SMAO-ES70-875: SMAO is methylalumoxane supported on silica ES™-70 (PQ Corporation, Conshohocken, Pa.) that has been calcined at 875° C. and was prepared in a manner similar to the following: In a 4 L stirred vessel in a drybox methylalumoxane (MAO, 30 wt % in toluene, approx. 1,000 grams) is added along with approx. 2,000 g of toluene. This solution is then stirred at 60 RPM for 5 minutes. Next, approx. 800 grams of ES-70-875 silica is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1,100 g of supported MAO will be collected.

ES-70-875 silica is ES70™ silica (PQ Corporation, Conshohocken, Pa.) that has been calcined at approx. 875° C. Specifically, the ES70™ silica is calcined at 880° C. for four hours after being ramped to 880° C. according to the following ramp rates:

| ° C. | ° C./h | ° C. |
|---|---|---|
| ambient | 100 | 200 |
| 200 | 50 | 300 |
| 300 | 133 | 400 |
| 400 | 200 | 800 |
| 800 | 50 | 880 |

Supported Catalyst was prepared as follows: Metal complex (39.7 mg) was slurried in toluene (ca. 6 mL) and 1.14 g SMAO (6.5 mmol Al/g support) was added with stirring. After 20 min the solid was isolated by filtration, washed (2×5 mL) with pentane and dried under vacuum (ca. 20 minutes) to give a supported catalyst (Zr loading ca. 40 umol/g cat; Al/Zr is about 115).

General Procedure for High Throughput Ethylene/1-octene Polymerization and Polymer Characterization (Table 1)

Starting material preparations: Solvents, polymerization grade toluene and isohexane were supplied by ExxonMobil Chemical Company and thoroughly dried and degassed prior to use. Polymerization grade ethylene was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. TnOAl (tri-n-octylaluminum, neat) was used as a 2 mmol/L solution in toluene.

Products were characterized as follows:

$^1H$ NMR:

$^1H$ NMR data was collected at room temperature in a 5 mm probe using a Varian spectrometer with a $^1H$ frequency of at least 400 MHz. Data was recorded using a maximum pulse width of 45° C., 8 seconds between pulses and signal averaging 120 transients.

Gel Permeation Chromatography—Tosoh EcoSEC High Temperature GPC System (GPC-Tosoh EcoSEC)

$g'_{vis}$, Mw, Mn and Mw/Mn are determined by using a High Temperature Gel Permeation Chromatography (Tosoh Bioscience LLC), equipped with a differential refractive index detector (DRI). Three high temperature TSK gel columns (Tosoh GMHHR-H(30)HT2) are used. The nominal flow rate is 1.0 mL/min, and the nominal injection volume is 300 μL. The various transfer lines, columns, and dual flow differential refractometer (the DRI detector) are contained in an oven maintained at 160° C. Solvent for the experiment is prepared by dissolving 1.2 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/mL, with lower concentrations being used for higher molecular weight samples. Flow rate in the apparatus is then increased to 1.0 mL/minute, and the DRI is allowed to stabilize for 2 hours before injecting the first sample. The molecular weight is determined by combining universal calibration relationship with the column calibration which is performed with a series of monodispersed polystyrene (PS) standards. The MW is calculated at each elution volume with the following equation:

$$\log M_X = \frac{\log(K_X/K_{PS})}{a_X+1} + \frac{a_{PS}+1}{a_X+1}\log M_{PS}$$

where the variables with subscript "X" stand for the test sample while those with subscript "PS" stand for PS. In this method, $a_{PS}=0.67$ and $K_{PS}=0.000175$ while $a_X$ and $K_X$ are obtained from published literature. Specifically, a/K=0.695/0.000579 for polyethylene and 0.705/0.0002288 for polypropylene.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. Specifically, dn/dc=0.109 for both polyethylene and polypropylene.

The mass recovery is calculated from the ratio of the integrated area of the concentration chromatography over elution volume and the injection mass which is equal to the pre-determined concentration multiplied by injection loop volume.

In this method, $\alpha_{PS}=0.67$ and $K_{PS}=0.000175$ while $\alpha$ and K are for other materials as calculated and published in literature (Sun, T. et al. Macromolecules 2001, v.34, pp. 6812), except that for purposes of the present disclosure, $\alpha=0.695$ and K=0.000579 for linear ethylene polymers, $\alpha=0.705$ and K=0.0002288 for linear propylene polymers, $\alpha=0.695$ and K=0.000181 for linear butene polymers, $\alpha$ is 0.695 and K is 0.000579*(1−0.0087*w2b+0.000018*(w2b)^2) for ethylene-butene copolymer where w2b is a bulk weight percent of butene comonomer, $\alpha$ is 0.695 and K is 0.000579*(1−0.0075*w2b) for ethylene-hexene copolymer where w2b is a bulk weight percent of hexene comonomer, and $\alpha$ is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000TC) as a function of molecular weight. The short-chain branch (SCB) content per 1,000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which $f$ is 0.3, 0.4, 0.6, 0.8, and so on for C3, C4, C6, C8, and so on co-monomers, respectively.

$$w2 = f * SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1,000TC (bulk CH3end/1000TC) is obtained by weight-averaging the chain-end correction over the molecular-weight range. Then $$w2b = f * \text{bulk CH3}/1000TC$$

$$\text{bulk } SCB/1000TC = \text{bulk CH3}/1000TC - \text{bulk}\frac{\text{CH3end}}{1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda=665$ nm. For analyzing polyethylene homopolymers, ethylene-hexene copolymers, and ethylene-octene copolymers, dn/dc=0.1048 ml/mg and $A_2=0.0015$; for analyzing ethylene-butene copolymers, dn/dc=0.1048*(1−0.00126*w2) ml/mg and $A_2=0.0015$ where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the equation $[\eta]=\eta_S/c$, where c is concentration and is determined from the IR5 broadband channel output. The viscosity MW at each point is calculated as $M = K_{PS} M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_v$ is the viscosity-average molecular weight based on molecular weights determined by LS analysis and the K and α are for the reference linear polymer, which are, for purposes of the present disclosure, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, v.34(19), pp. 6812-6820).

All molecular weights are reported in g/mol unless otherwise noted.

$C_8$ wt % is determined by ¹H NMR.

Methyl groups per 1,000 carbons ($CH_3$/1000 Carbons) is determined by ¹H NMR.

The results obtained for the ethylene-octene polymerization using catalysts supported on SMAO are illustrated in Table 1 in which Catalyst 1 is the Zr-containing catalyst compound.

As shown in Table 1, Catalyst 38 (Scheme 1) was found to be an active catalyst for olefin polymerization upon activation with DMAH-PFPB. Indeed, high molecular weight (HWM) polymers formed at 100° C. and under 135 psig in the presence of DMAH-PFPB and 1-octene were obtained in good yield with an Mw value of 87 Kg/mol and an Mn value of 38 Kg/mol or greater, and a narrow PDI of about 1.5 to 2.2. Furthermore, Catalyst 1 demonstrated a low 1-octene incorporation with comonomer content of about 4.0 wt %.

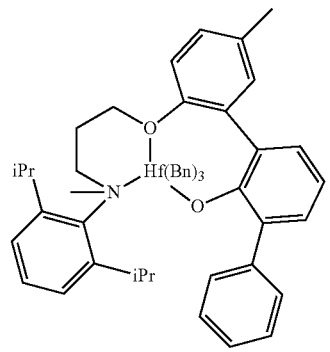

Cat. 40

TABLE 1

Ethylene-Octene polymerization data

| catalyst | 0.08 μmol Catalyst 38 |
| --- | --- |
| activator | 1.1 eq DMAH-PFPB |
| 1-octene | 100 uL |
| volume of solution | 5 mL |
| solvent | isohexane |
| temperature | 100° C. |
| pressure setpoint | 135 psig |

| | Example 1a | Example 1b |
| --- | --- | --- |
| reaction time, s | 1801 | 1800 |
| yield, g | 0.019 | 0.019 |
| activity, g/mmol-h | 475 | 475 |
| Mw, kg/mol | 87 | 58 |
| Mn, kg/mol | 40 | 38 |
| PDI (Mw/Mn) | 2.2 | 1.5 |
| wt % octene | 4.0 | 3.9 |
| polymer Tm, ° C. | 128.5 | 128.3 |
| ΔHf, J/g | 105.4 | 105.9 |

Tables 2, 3 and 4 illustrate comparative results obtained for Catalysts 1 (with M=Zr) and 2 (with M=Hf) (Scheme 2). Catalysts 1 and 2 are found to be active catalysts for olefin polymerization upon activation with DMAH-PFPB and MAO, respectively. The polymerization process was performed using 0.08 μmol of the catalyst with 1.1 equivalents of DMAH-PFPB (in the presence of TNOAL as a scavenger) or 500 equivalents of MAO in isohexane, at either 80° C. and 95 psig, or 100° C. and 135 psig. Both Catalysts 1 and 2 demonstrated a high 1-octene incorporation with comonomer content of about 5.8 wt % to 8.5 wt %. When using MAO as the activator, either with Catalyst 1 or 2, low molecular weight polymers were obtained, with Catalyst 2 giving the lowest molecular weight polymer with an Mw of 23 Kg/mol and Mn of 16 Kg/mol and lowest catalyst activity of 4 KgP/mmolCat/hr to 9 KgP/mmolCat/hr (Table 2, rows 13-16), whereas Catalyst 1 provides low molecular weight polymers but shows the highest catalyst activity of 100

KgP/mmolCat/hr to 140 KgP/mmolCat/hr. All polymers were obtained with narrow Mw/Mn of 1.2 to 1.6.

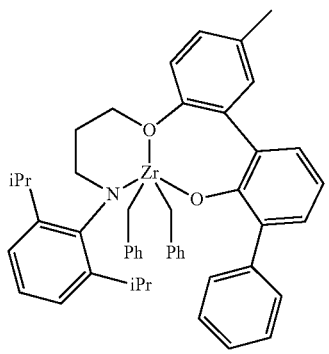

Cat. 1

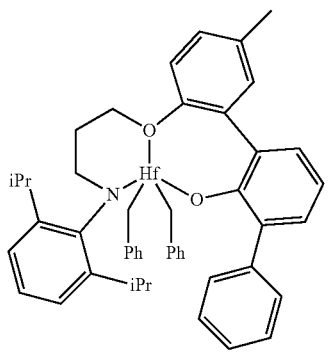

Cat. 2

TABLE 2

| catalyst | 0.08 μmol |
|---|---|
| activator | 1.1 eq DMAH-PFPB or 500 eq MAO |
| 1-octene | 100 μL |
| volume of solution | 5 mL |
| solvent | Isohexane |

TABLE 3

| Run | Catalyst | catalyst μmol | activator | scavenger | scavenger μmol | T (° C.) | P setpt (psi) | uptake (psig) | reaction time (s) |
|---|---|---|---|---|---|---|---|---|---|
| 1 | 1 | 0.08 | DMAH-PFPB | TNOAL | 0.5 | 80 | 95 | 20.1 | 41 |
| 2 | 1 | 0.08 | DMAH-PFPB | TNOAL | 0.5 | 80 | 95 | 20.1 | 42 |
| 3 | 1 | 0.08 | DMAH-PFPB | TNOAL | 0.5 | 100 | 135 | 20.3 | 37 |
| 4 | 1 | 0.08 | DMAH-PFPB | TNOAL | 0.5 | 100 | 135 | 20.1 | 34 |
| 5 | 1 | 0.08 | MAO | | | 80 | 95 | 20.5 | 30 |
| 6 | 1 | 0.08 | MAO | | | 80 | 95 | 20.6 | 35 |
| 7 | 1 | 0.08 | MAO | | | 100 | 135 | 20.5 | 25 |
| 8 | 1 | 0.08 | MAO | | | 100 | 135 | 20.3 | 30 |
| 9 | 2 | 0.08 | DMAH-PFPB | TNOAL | 0.5 | 80 | 95 | 20.1 | 50 |
| 10 | 2 | 0.08 | DMAH-PFPB | TNOAL | 0.5 | 80 | 95 | 20.3 | 61 |
| 11 | 2 | 0.08 | DMAH-PFPB | TNOAL | 0.5 | 100 | 135 | 20.6 | 31 |
| 12 | 2 | 0.08 | DMAH-PFPB | TNOAL | 0.5 | 100 | 135 | 20.3 | 33 |
| 13 | 2 | 0.08 | MAO | | | 80 | 95 | 20.1 | 434 |
| 14 | 2 | 0.08 | MAO | | | 80 | 95 | 20.1 | 508 |
| 15 | 2 | 0.08 | MAO | | | 100 | 135 | 20.1 | 285 |
| 16 | 2 | 0.08 | MAO | | | 100 | 135 | 20.1 | 274 |

TABLE 4

| Run | Catalyst | yield (g) | activity (kg/mmol/hr) | Mw (kg/mol) | Mn (kg/mol) | PDI (Mw/Mn) | wt% C8 | Tm (° C.) |
|---|---|---|---|---|---|---|---|---|
| 1 | 1 | 0.076 | 84 | 184 | 139 | 1.3 | 7.2 | 117.2 |
| 2 | 1 | 0.070 | 75 | 175 | 134 | 1.3 | 7.2 | 118.7 |
| 3 | 1 | 0.069 | 84 | 175 | 122 | 1.4 | 7.1 | 119.2 |
| 4 | 1 | 0.065 | 85 | 154 | 109 | 1.4 | 6.9 | 119.5 |
| 5 | 1 | 0.094 | 140 | 53 | 36 | 1.5 | 8.1 | 117.0 |
| 6 | 1 | 0.090 | 117 | 61 | 40 | 1.5 | 8.5 | 116.9 |
| 7 | 1 | 0.070 | 128 | 69 | 48 | 1.4 | 6.1 | 116.9 |
| 8 | 1 | 0.066 | 100 | 83 | 56 | 1.5 | 7.7 | 117.3 |
| 9 | 2 | 0.064 | 57 | 152 | 124 | 1.2 | 7.7 | 115.9 |
| 10 | 2 | 0.049 | 36 | 111 | 89 | 1.3 | 5.8 | 120.0 |
| 11 | 2 | 0.063 | 91 | 134 | 113 | 1.2 | 6.7 | 117.6 |
| 12 | 2 | 0.058 | 79 | 126 | 106 | 1.2 | 6.9 | 117.9 |
| 13 | 2 | 0.044 | 5 | 23 | 16 | 1.5 | 8.5 | 117.1 |
| 14 | 2 | 0.044 | 4 | 24 | 16 | 1.5 | 8.1 | 116.9 |
| 15 | 2 | 0.059 | 9 | 40 | 25 | 1.6 | 6.4 | 118.1 |
| 16 | 2 | 0.045 | 7 | 44 | 28 | 1.6 | 7.7 | 118.9 |

Overall, catalysts, catalyst systems, and processes of the present disclosure can provide polyolefins at high catalyst activity values of 400,000 gP/mmolCat·h$^{-1}$ or greater, and polyolefins, such as polyethylene copolymers, having comonomer content of from about 3.5 wt % to 8.5 wt %, an Mn of 20,000 g/mol or greater, an Mw of from 100,000 g/mol to 300,000 g/mol or greater, and a narrow PDI of from 1 to 2.5. Catalysts, catalyst systems, and processes of the present disclosure can provide polymers having excellent comonomer contents (e.g., comonomer content of from 7 wt % to 12, such as from 8 wt % to 10 wt %).

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A catalyst compound represented by Formula (I):

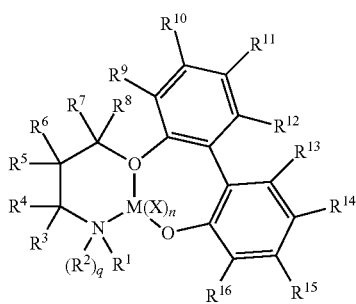

(I)

wherein:
M is a group 4 metal;
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, or $R^{16}$ are joined together to form a $C_4$-$C_{62}$ cyclic or polycyclic ring structure, or a combination thereof;
each X is independently $C_1$-$C_{20}$ hydrocarbyl, $C_1$-$C_{20}$ substituted hydrocarbyl, a heteroatom or a heteroatom-containing group, or two or more Xs join together to form a $C_4$-$C_{62}$ cyclic or polycyclic ring structure;
q is 0 or 1; and
n is 2 or 3, wherein when q is 0, then n is 2, and when q is 1, then n is 3.

2. The catalyst compound of claim 1, wherein q is 1.

3. The catalyst compound of claim 2, wherein $R^2$ is hydrogen or $C_1$-$C_{40}$ hydrocarbyl.

4. The catalyst compound of claim 3, wherein $R^2$ is $C_1$-$C_{10}$ hydrocarbyl.

5. The catalyst compound of claim 1, wherein $R^1$ is represented by the structure:

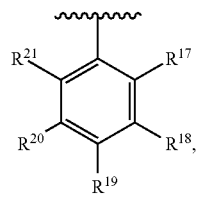

wherein each of $R^{17}$, $R^{18}$, $R^{19}$, $R^{20}$, and $R^{21}$ is independently selected from hydrogen, $C_1$-$C_{40}$ hydrocarbyl, $C_1$-$C_{40}$ substituted hydrocarbyl, a heteroatom or a heteroatom-containing group, or two or more of $R^{17}$, $R^{18}$, $R^{19}$, $R^{20}$, and $R^{21}$ are joined together to form a $C_4$-$C_{62}$ cyclic or polycyclic ring structure, or a combination thereof.

6. The catalyst compound of claim 5, wherein each of $R^{17}$, $R^{18}$, $R^{19}$, $R^{20}$, and $R^{21}$ is independently selected from hydrogen or $C_1$-$C_{40}$ hydrocarbyl.

7. The catalyst compound of claim 6, wherein each of $R^{17}$ and $R^{21}$ is $C_1$-$C_{10}$ hydrocarbyl.

8. The catalyst system of claim 7, wherein each of $R^{18}$, $R^{19}$, and $R^{20}$ is hydrogen.

9. The catalyst system of claim 1, wherein $R^{16}$ is selected from unsubstituted phenyl, substituted phenyl, unsubstituted carbazole, substituted carbazole, unsubstituted naphthyl, substituted naphthyl, unsubstituted anthracenyl, substituted anthracenyl, unsubstituted fluorenyl, or substituted fluorenyl.

10. The catalyst system of claim 9, wherein $R^{16}$ is unsubstituted phenyl.

11. The catalyst system of claim 9, wherein $R^{16}$ is unsubstituted carbazole.

12. The catalyst compound of claim 1, wherein each of $R^3$, $R^4$, $R^5$, $R^6$, $R^7$, and $R^8$ is independently hydrogen or $C_1$-$C_{10}$ hydrocarbyl.

13. The catalyst compound of claim 12, wherein three or more of $R^3$, $R^4$, $R^5$, $R^6$, $R^7$, and $R^8$ are hydrogen.

14. The catalyst compound of claim 13, wherein each of $R^3$, $R^4$, $R^5$, $R^6$, $R^7$, and $R^8$ is hydrogen.

15. The catalyst compound of any of claim 1, wherein M is Zr or Hf.

16. The catalyst compound of claim 1, wherein each X is methyl, benzyl, or chloro.

17. The catalyst compound of claim 1, wherein the catalyst compound is one or more of:

1
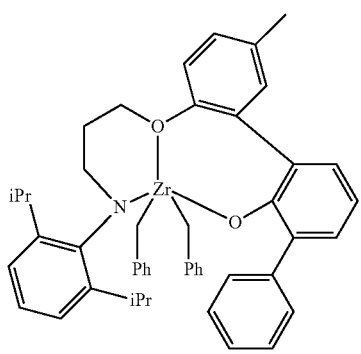
2
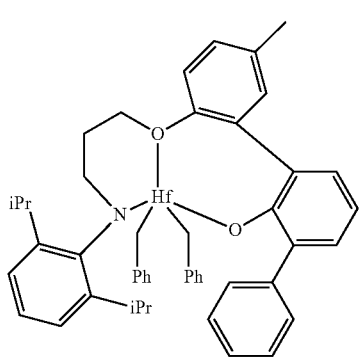
3
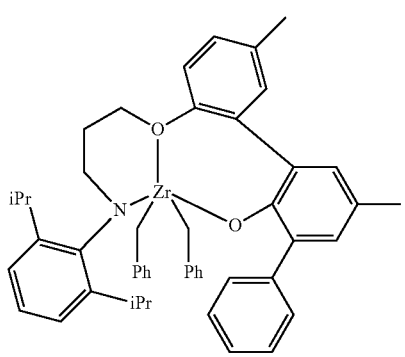
4
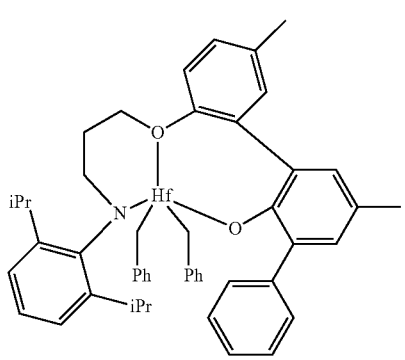
-continued
5
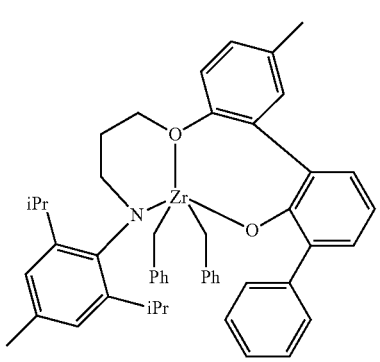
6
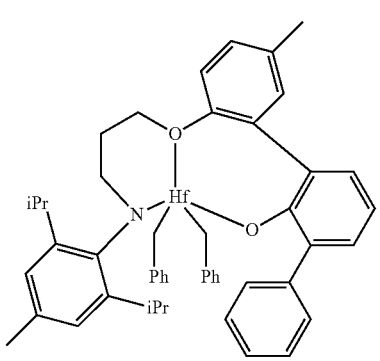
7
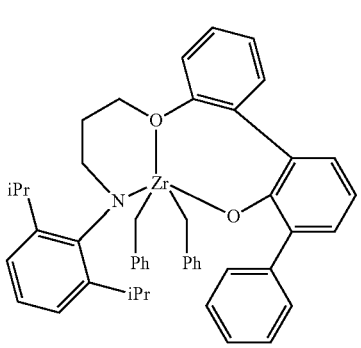
8
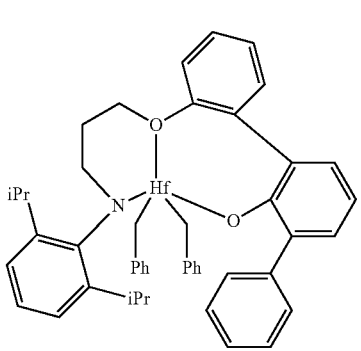

9
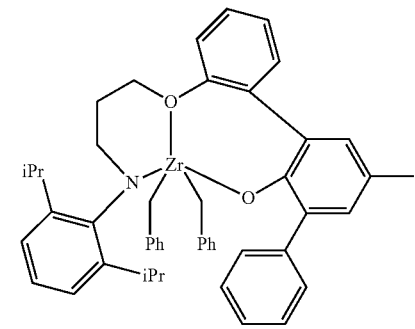
10
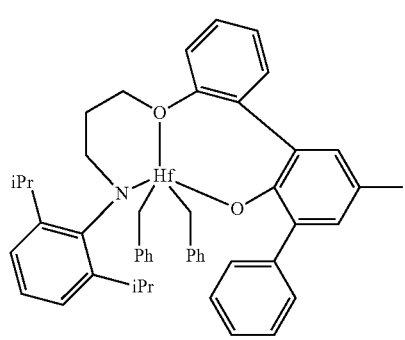
11
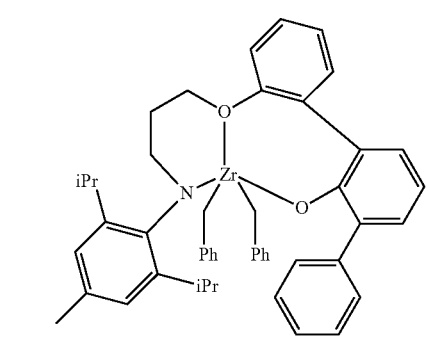
12
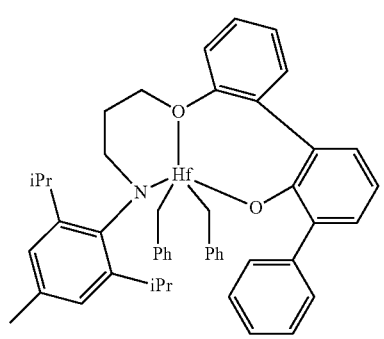
13
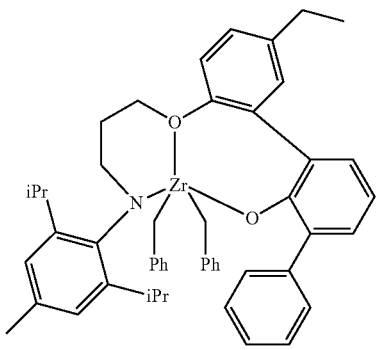
14
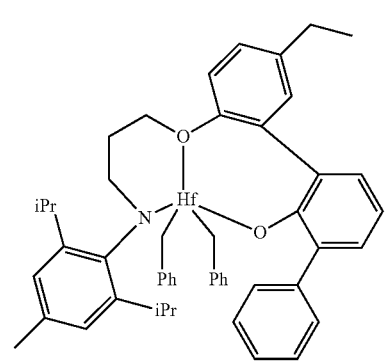
15
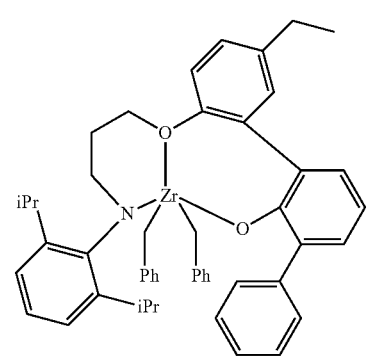
16
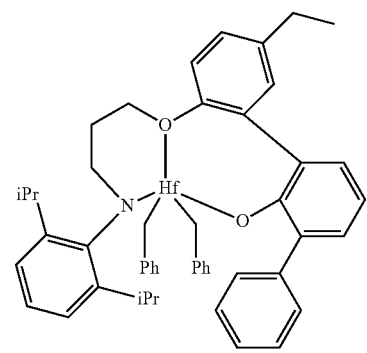

17
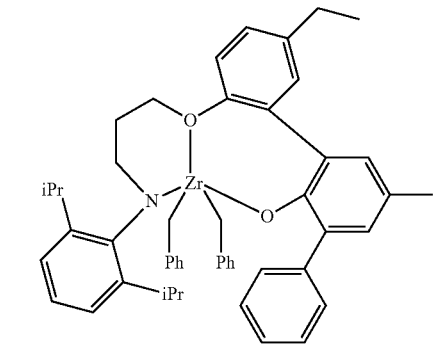
18
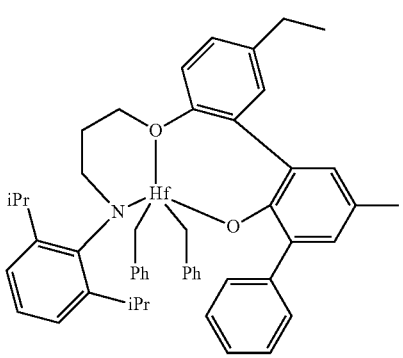
19
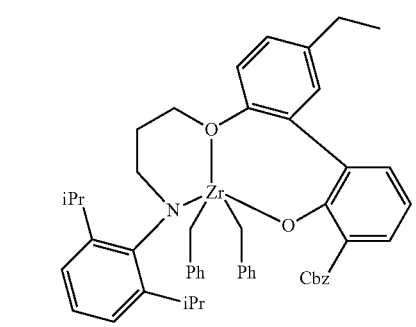
20
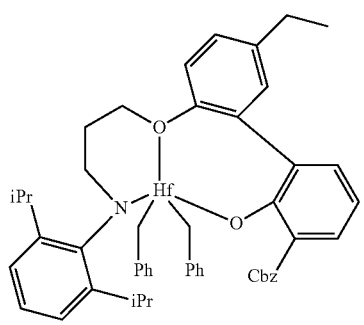
21
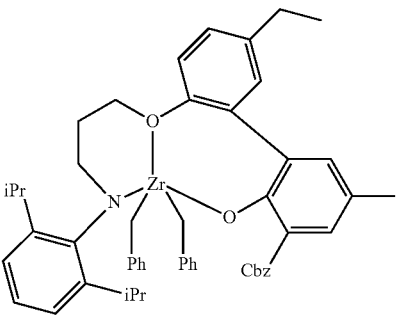
22
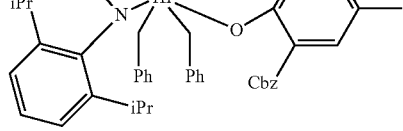
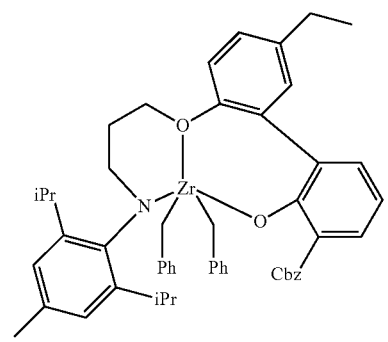
23
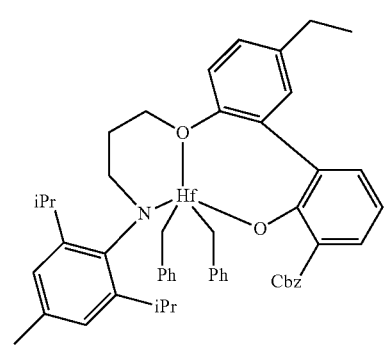
24
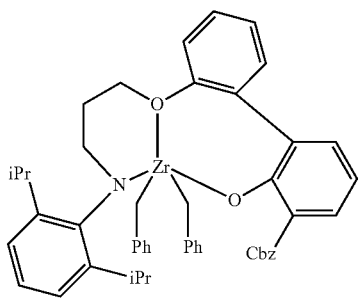
25

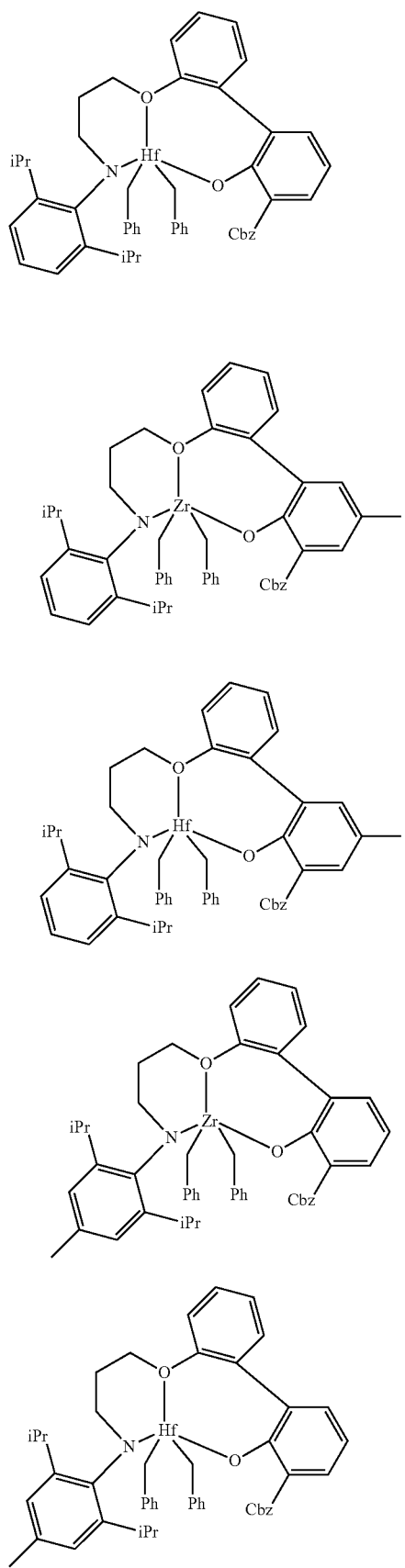
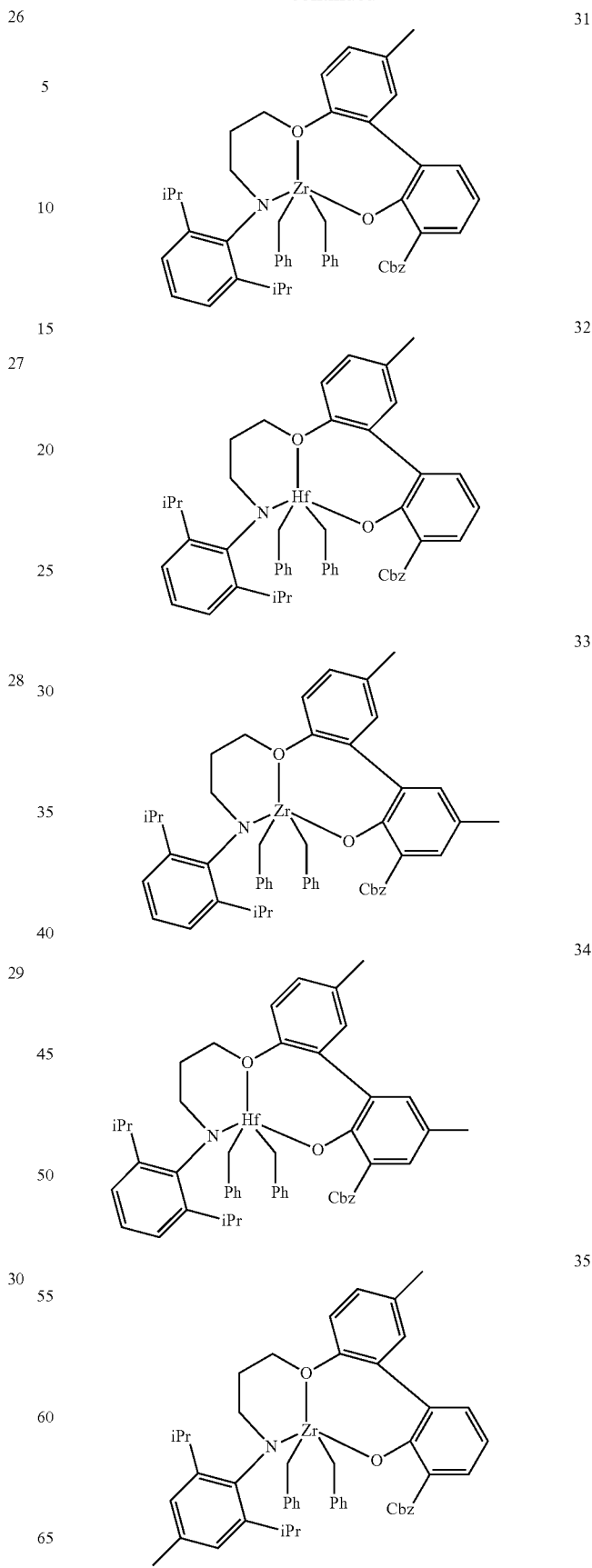

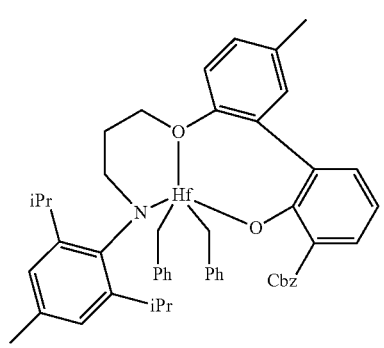
36
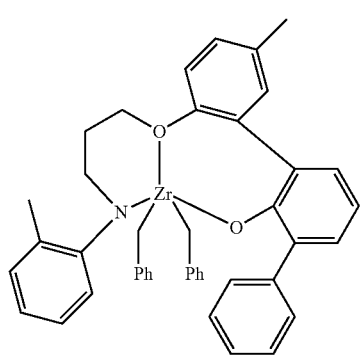
37
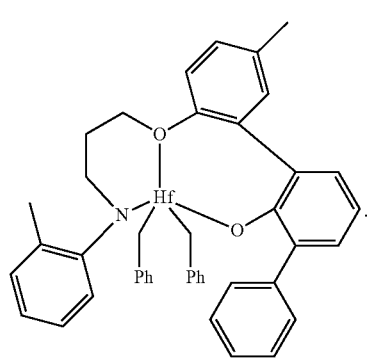
38
18. The catalyst compound of claim 1, wherein the catalyst compound is one or more of:
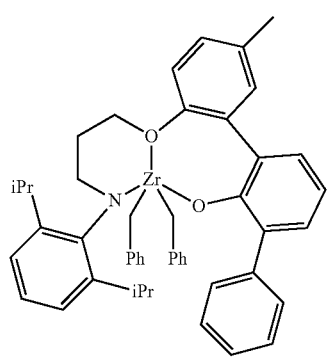
1
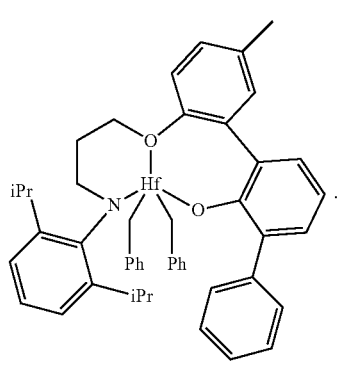
2
19. The catalyst compound of claim 1, wherein the catalyst compound is one or more of:
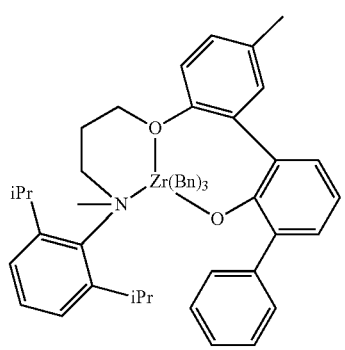
39
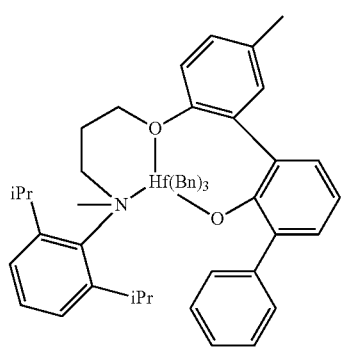
40
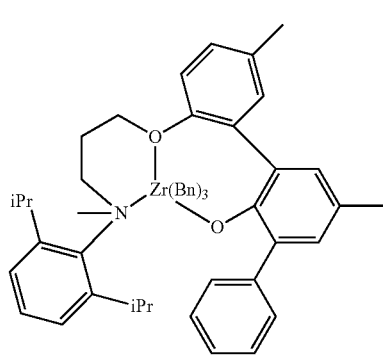
41

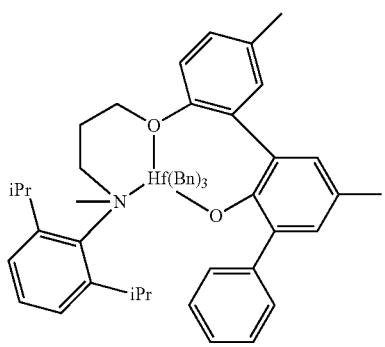
42
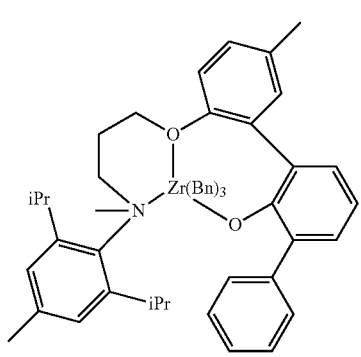
43
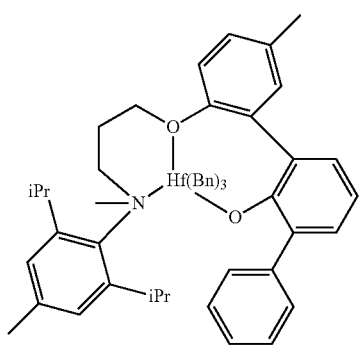
44
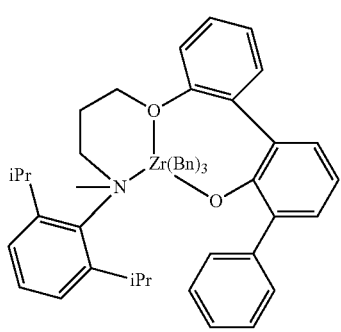
45
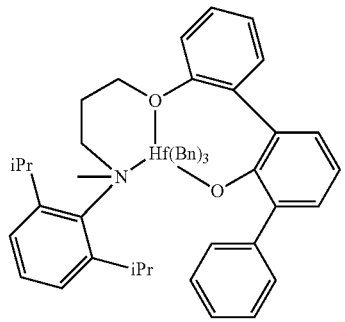
46
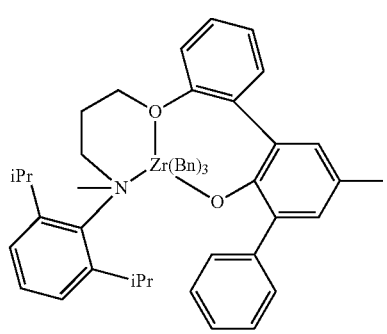
47
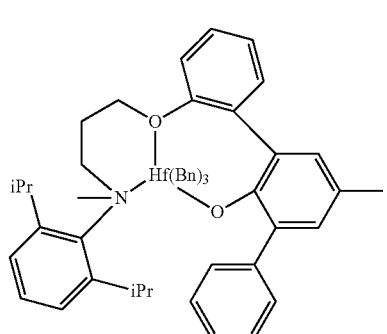
48
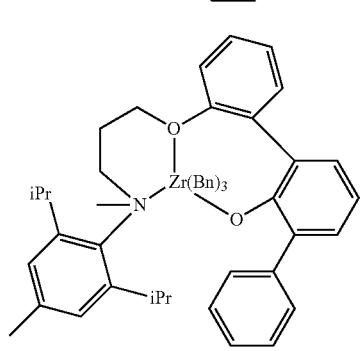
49
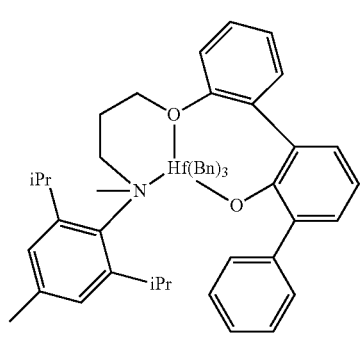
50

51
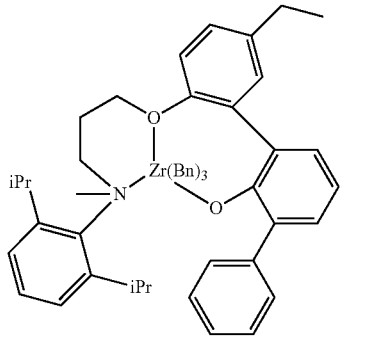
52
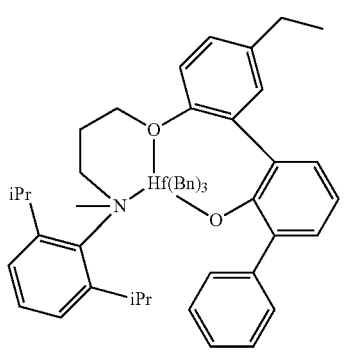
53
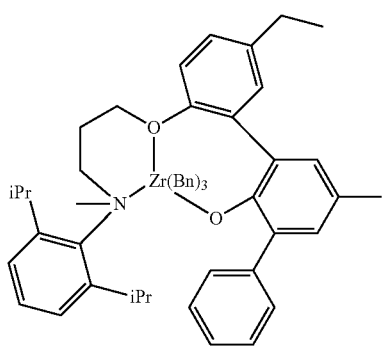
54
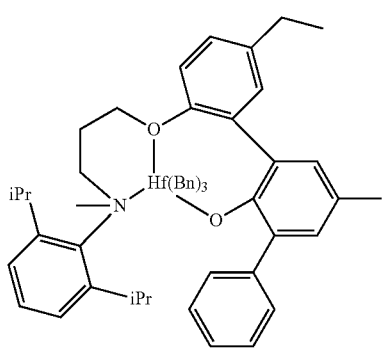
55
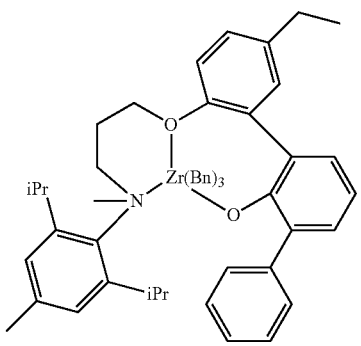
56
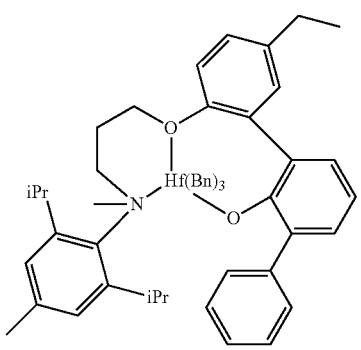
57
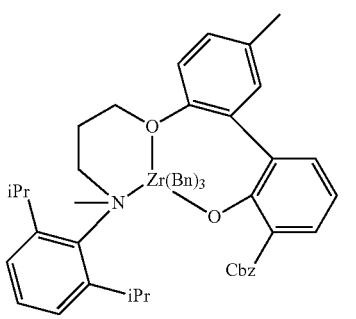
58
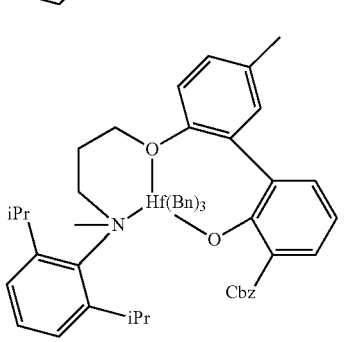
59
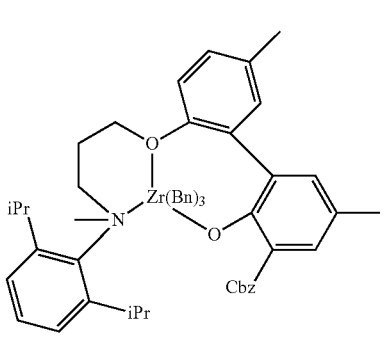

60
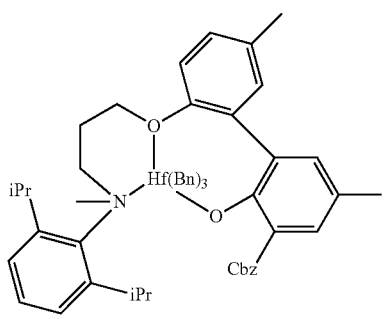
61
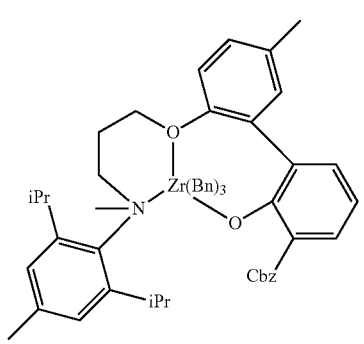
62
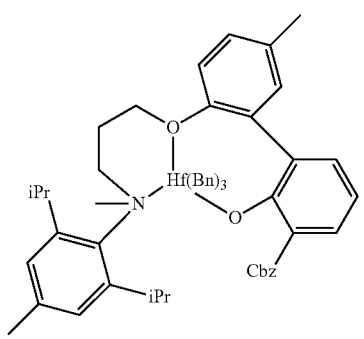
63
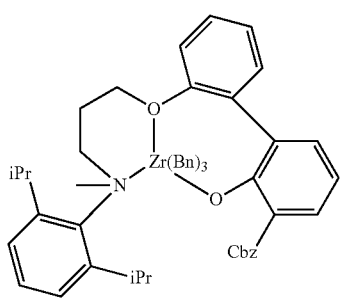
64
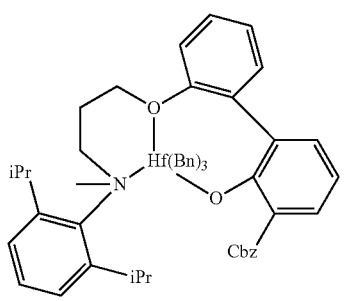
65
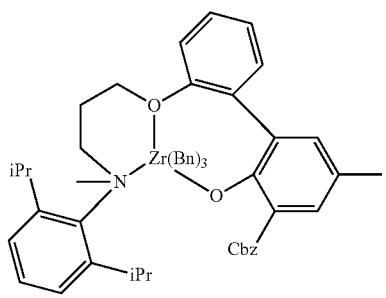
66
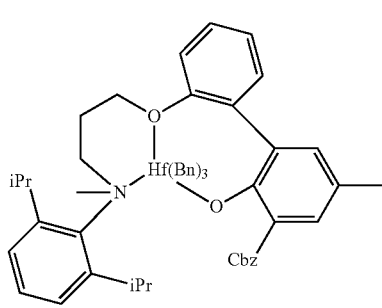
67
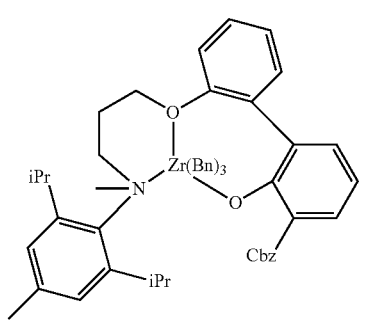
68
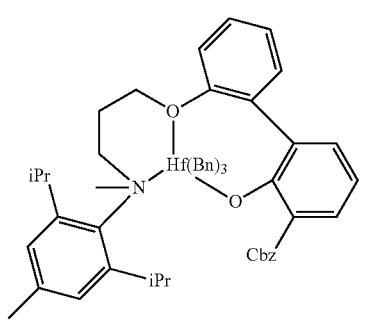
69
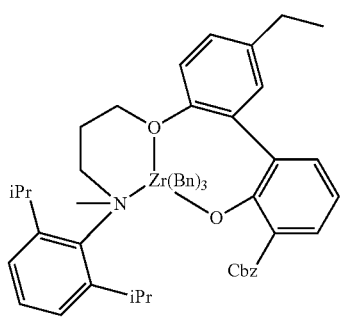

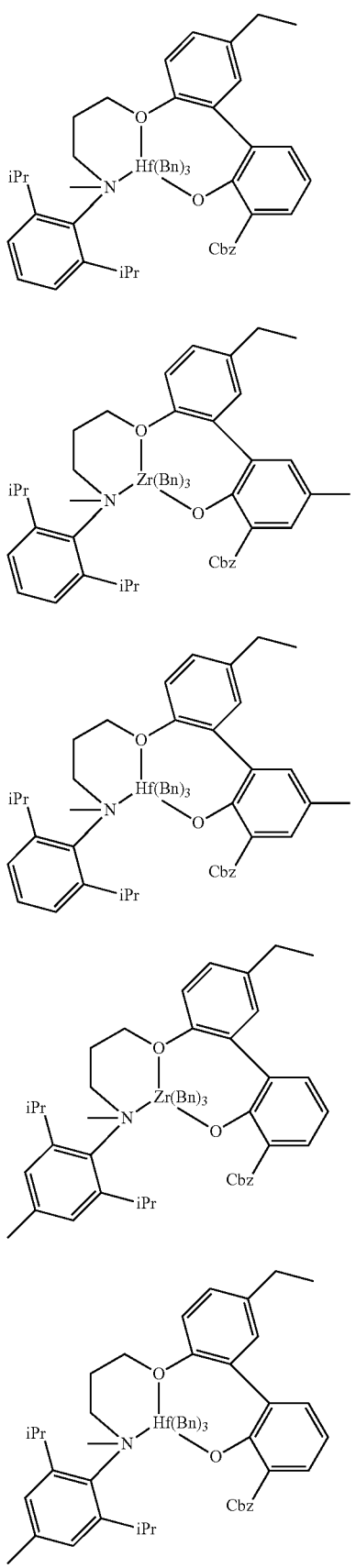
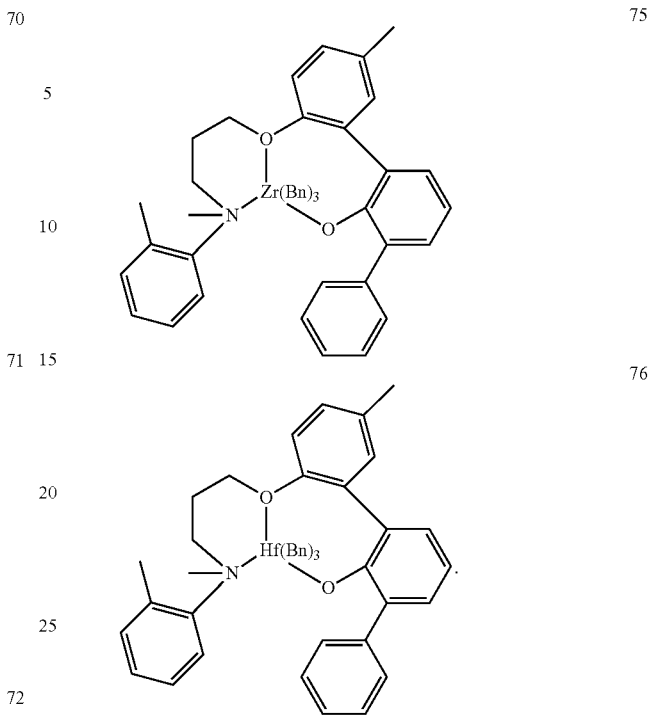
20. The catalyst compound of claim 1, wherein the catalyst compound is one or more of:
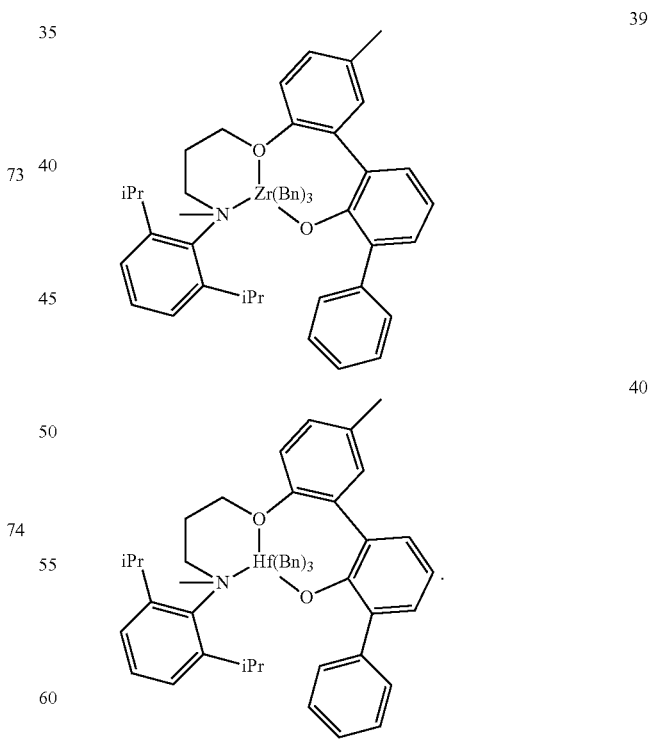
21. A catalyst system comprising an activator and the catalyst compound of claim 1.
22. The catalyst system of claim 21, further comprising a support material.

23. The catalyst system of claim 22, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.

24. The catalyst system of claim 21, wherein the activator comprises an alkylalumoxane.

25. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of claim 21 in at least one solution polymerization reactor at a reactor pressure of from 2 MPa to 200 MPa and a reactor temperature of from 10° C. to 250° C. to form an ethylene alpha-olefin copolymer.

26. The process of claim 25, wherein the catalyst system has an activity of 10,000 g/mmol/hour or greater.

27. The process of claim 26, wherein the catalyst system has an activity of 100,000 g/mmol/hour or greater.

28. The process of claim 27, wherein the catalyst system has an activity of 400,000 g/mmol/hour or greater.

29. The process of claim 25, wherein the ethylene alpha-olefin copolymer has a Mw value of from 100,000 to 300,000 g/mol or greater.

30. The process of claim 25, wherein the ethylene alpha-olefin copolymer has a Mw/Mn value of 5 or less.

31. The process of claim 28, wherein the ethylene alpha-olefin copolymer has a Mw/Mn value of from 1 to 2.5.

32. The process of claim 25, wherein the ethylene alpha-olefin copolymer has a comonomer content of from 7 wt % to 12 wt %.

33. The process of claim 32, wherein the ethylene alpha-olefin copolymer has a comonomer content of from 8 wt % to 10 wt %.

34. The process of claim 25, wherein the catalyst system has a catalyst activity of 400,000 gP/mmolCat·h$^{-1}$ or greater and the ethylene alpha-olefin copolymer has a comonomer content of from about 3.5 wt % to 8.5 wt %, a Mn of about 15,000 g/mol to about 140,000 g/mol, a Mw of from about 100,000 g/mol to about 300,000 g/mol, and a Mw/Mn of from 1 to 2.5.

* * * * *